United States Patent
Inokawa et al.

(10) Patent No.: US 8,355,808 B2
(45) Date of Patent: Jan. 15, 2013

(54) SERVER DEVICE OF GROUP MANAGEMENT SYSTEM HAVING FUNCTION OF PERFORMING FAULT DETECTION AND PROGRAM

(75) Inventors: Takumi Inokawa, Hokkaido (JP); Noriaki Koyama, Iwate (JP)

(73) Assignee: Tokyo Electron Limited, Tokyo (JP)

( * ) Notice: Subject to any disclaimer, the term of this patent is extended or adjusted under 35 U.S.C. 154(b) by 661 days.

(21) Appl. No.: 12/300,015

(22) PCT Filed: Apr. 24, 2007

(86) PCT No.: PCT/JP2007/058791
§ 371 (c)(1),
(2), (4) Date: Nov. 7, 2008

(87) PCT Pub. No.: WO2007/129567
PCT Pub. Date: Nov. 15, 2007

(65) Prior Publication Data
US 2009/0177308 A1    Jul. 9, 2009

(30) Foreign Application Priority Data
May 9, 2006   (JP) ................. 2006-129729

(51) Int. Cl.
*G06F 17/00* (2006.01)

(52) U.S. Cl. ....... 700/110; 700/96; 700/108; 427/248.1; 715/772

(58) Field of Classification Search ............ 700/96, 700/110, 108; 427/248.1; 715/772
See application file for complete search history.

(56) References Cited

U.S. PATENT DOCUMENTS

| | | | |
|---|---|---|---|
| 2002/0097763 A1 | 7/2002 | Marsh et al. | |
| 2006/0045969 A1* | 3/2006 | Yamamoto et al. | 427/248.1 |
| 2006/0184264 A1* | 8/2006 | Willis et al. | 700/108 |

FOREIGN PATENT DOCUMENTS

| | | |
|---|---|---|
| JP | 11-354395 A | 12/1999 |
| JP | 2002-025997 A | 1/2002 |
| JP | 2005-142467 A | 6/2005 |
| JP | 2005-347371 A | 12/2005 |
| JP | 2005-536891 | 12/2005 |
| WO | 2004019147 A2 | 3/2004 |
| WO | 2005045907 A1 | 5/2005 |

OTHER PUBLICATIONS

Dorough, et al., "Tactical Advanced Process Control," International Semiconductor Manufacturing Symposium, 2003, p. 358-361.
International Search Report for PCT/JP2007/058791 dated May 11, 2007.

* cited by examiner

*Primary Examiner* — Tejal Gami
(74) *Attorney, Agent, or Firm* — Pearne & Gordon LLP

(57) ABSTRACT

It is possible to compose a chart by filtering measurement information using a product wafer number in a server device including: an instruction receiving unit for storing therein plural measurement information, which is time sequential information measured in a plurality of manufacturing apparatuses and has a product wafer number and time information, and for receiving an output instruction of a chart containing the product wafer number; a fault detection unit for, when the instruction receiving unit receives the output instruction, reading a multiplicity of measurement information satisfying a product wafer number condition contained in the output instruction, and determining whether the read multiplicity of measurement information satisfies the condition information; an output information composing unit for composing the output information according to a determination result of the fault detection unit; and an output unit for outputting the output information composed by the output information composing unit.

16 Claims, 11 Drawing Sheets

FIG. 7

| MANUFACTURING APPARATUS IDENTIFIER | RECIPE IDENTIFIER | PRODUCT WAFER NUMBER | VALUE (GAS FLOW RATE) | TIME INFORMATION |
|---|---|---|---|---|
| E1 | R5 | 20 | 258 | 2005/12/02 15:00:00 |
| | | | 260 | 2005/12/02 15:00:01 |
| | | | 260 | 2005/12/02 15:00:02 |
| | | | ⋮ | ⋮ |
| E1 | R5 | 40 | 256 | 2005/12/03 13:00:00 |
| | | | 248 | 2005/12/03 13:00:01 |
| | | | 233 | 2005/12/03 13:00:02 |
| | | | ⋮ | ⋮ |
| E1 | R4 | 30 | 261 | 2005/12/03 14:00:00 |
| | | | 261 | 2005/12/03 14:00:01 |
| | | | ⋮ | ⋮ |
| E2 | R3 | 38 | 254 | 2005/12/04 10:00:30 |
| | | | 241 | 2005/12/04 10:00:31 |
| | | | ⋮ | ⋮ |

FIG. 8

| MANUFACTURING APPARATUS IDENTIFIER | RECIPE IDENTIFIER | PRODUCT WAFER NUMBER | MEAN VALUE | TIME INFORMATION |
|---|---|---|---|---|
| E1 | R5 | 20 | 259 | 2005/12/02 15:00:00 |
| | | | 259 | 2005/12/02 16:00:00 |
| | | | 258 | 2005/12/02 17:00:00 |
| | | | ⋮ | ⋮ |
| E1 | R5 | 40 | 230 | 2005/12/03 13:00:00 |
| | | | 217 | 2005/12/03 14:00:00 |
| | | | 219 | 2005/12/03 15:00:00 |
| | | | ⋮ | ⋮ |
| E2 | R4 | 30 | 260 | 2005/12/03 14:00:00 |
| | | | 261 | 2005/12/03 15:00:00 |
| | | | ⋮ | ⋮ |
| E1 | R1 | 38 | 239 | 2005/12/04 10:00:30 |
| | | | 225 | 2005/12/04 11:00:30 |
| | | | ⋮ | ⋮ |

| MANUFACTURING APPARATUS IDENTIFIER | RECIPE IDENTIFIER | PRODUCT WAFER NUMBER | MEAN VALUE | TIME INFORMATION |
|---|---|---|---|---|
| E1 | R5 | 40 | 230 | 2005/12/03 13:00:00 |
| | | | 217 | 2005/12/03 14:00:00 |
| | | | 219 | 2005/12/03 15:00:00 |
| | | | ⋮ | ⋮ |
| E1 | R1 | 30 | 239 | 2005/12/04 10:00:30 |
| | | | 225 | 2005/12/04 11:00:30 |
| | | | ⋮ | ⋮ |

SERVER DEVICE OF GROUP MANAGEMENT SYSTEM HAVING FUNCTION OF PERFORMING FAULT DETECTION AND PROGRAM

TECHNICAL FIELD

The present invention relates to a group management system including a plurality of manufacturing apparatuses for performing a preset process on a target substrate, and a server device connected with the plurality of manufacturing apparatuses; and also relates to a server.

BACKGROUND ART

With regard to a conventional group management system, there has been realized a measurement information processing method capable of automatically and correctly processing data transmitted from a measuring device in a group management system of semiconductor manufacturing apparatuses (see, for example, Patent Document 1). In this measurement information processing method, a measuring device communication unit of a group managing unit of the group management system receives various kinds of measurement information transmitted from the measuring device. This measurement information processing method includes the steps of registering formulas for processing the measurement information in advance; upon receiving the measurement information, storing therein the received measurement information in a measurement information receiving buffer; selecting, among the registered formulas, one formula suitable for processing the measurement information and having at least one same recipe name as a recipe name of the measurement information and storing therein the selected formula in a formula storing buffer; applying the measurement information to the selected formula and performing a calculation; and storing therein a calculation result in a processed data storing buffer.

Further, the conventional group management system of semiconductor manufacturing apparatuses has a function of displaying time sequential information (hereinafter, referred to as a chart) measured by the semiconductor manufacturing apparatuses.

Furthermore, as an example manufacturing apparatus constituting the group management system, there is a batch type vertical heat treatment apparatus (see Patent Document 2 and Patent Document 3).

Patent Document 1: Japanese Patent Laid-open Application No. H11-354395 (e.g., Page 1 and FIG. 1)

Patent Document 2: Japanese Patent No. 3543996 (e.g., Page 1 and FIG. 1)

Patent Document 3: Japanese Patent Laid-open Application No. 2002-25997 (e.g., Page 1 and FIG. 1)

DISCLOSURE OF THE INVENTION

Problems to be Solved by the Invention

However, in the conventional group management system of semiconductor manufacturing apparatuses, it has been impossible to detect a fault by filtering measurement information by way of using the number of product wafers as a key. For this reason, a highly accurate fault detection is yet to be accomplished. To elaborate, when the fault detection was performed by filtering the measurement information by way of using a total number of wafers including dummy wafers as a key, a non-uniformity of the measurement information was high and a wide range of threshold values for determining a fault is needed to be set in order not to detect a normal state as a fault state. As a result, the highly accurate fault detection could not be carried out. Moreover, to be specific, a wiring (pattern) is formed on a product wafer so that the product wafer typically has prominences and depressions on its surface, while a dummy wafer has no wiring (pattern), typically. Accordingly, when flowing a gas depending on the number of product wafers, a resistance varies, and the difference in the resistances may result in a difference in a frequency of occurrence of a fault and a kind of the fault. In the conventional group management system of semiconductor manufacturing apparatuses, it has been impossible to perform the fault detection in consideration of the difference in the number of product wafers.

Means for Solving the Problems

A server device in accordance with the present invention is directed to a server device constituting a group management system, which includes a plurality of manufacturing apparatuses for performing a preset process on a target substrate and the server device connected with the plurality of manufacturing apparatuses and has a function of performing a fault detection, the server device including: a measurement information storage unit for storing therein plural measurement information, which is time sequential information measured in the plurality of manufacturing apparatuses and has a product wafer number indicating the number of product wafer to be manufactured in the manufacturing apparatuses and time information indicating time; an instruction receiving unit for receiving an output instruction for output information, which contains a product wafer number condition related to the product wafer number; a condition information storage unit for storing therein condition information indicating conditions for determining whether the measurement information has a fault; a fault detection unit for, when the instruction receiving unit receives the output instruction, reading a multiplicity of measurement information satisfying the product wafer number condition contained in the output instruction from the measurement information storage unit, and determining whether the read multiplicity of measurement information satisfies the condition information; an output information composing unit for composing the output information according to a determination result of the fault detection unit; and an output unit for outputting the output information composed by the output information composing unit.

BEST MODE FOR CARRYING OUT THE INVENTION

Hereinafter, a server device and so forth in accordance with embodiments of the present invention will be described in detail with reference to the accompanying drawings. In the embodiments, elements assigned like reference numerals are operated in the same way, so that redundant description thereof may be omitted.

Embodiment

FIG. 1 provides a conceptual diagram of a group management system in accordance with an embodiment of the present invention. The group management system is a system for controlling manufacturing apparatuses such as a semiconductor manufacturing apparatus, a liquid crystal panel manufacturing apparatus or the like. Further, the group management system includes one or more manufacturing apparatuses 11 (from a manufacturing apparatus 11(1) to a manufacturing apparatus 11(n)), a server device 12 and a client device 13.

The manufacturing apparatus 11 is an apparatus for performing a preset process on a target substrate. The manufacturing apparatus 11 performs, on the target substrate, various kinds of processes such as a film forming process, an etching process, a thermal oxidation process or the like. The manufacturing apparatus 11 is, for example, a batch type vertical heat treatment apparatus as disclosed in the aforementioned Patent Document 2 or Patent Document 3. An example of the manufacturing apparatus 11 is illustrated in FIG. 2. The manufacturing apparatus 11 is an apparatus having, as a loading chamber, a so-called load lock chamber structure capable of being airtightly sealed against other chambers while allowing a supply or a vacuum exhaust of an $N_2$ gas as a nonreactive atmosphere. The manufacturing apparatus 11 includes, as major components, a process tube a serving as a processing chamber for performing a preset process on a wafer W which is a target object to be processed; a load lock chamber h serving as a loading chamber having a transfer mechanism g for loading or unloading a wafer boat f into or from the process tube a, wherein the wafer boat f serves as a holder for accommodating therein a number of, for example, 100 sheets of wafer W; a loading/unloading chamber ab for loading or unloading the wafer W into or from the load lock chamber h; a cassette receptacle port ac formed inside the loading/unloading chamber ab; a transport mechanism ae for transporting a cassette receptacle ad loaded on the port ac into the loading/unloading chamber ab; a receptacle storage stage af for temporarily storing therein the transported cassette receptacle ad; a cassette take-out stage ag for taking out a cassette C accommodated in the cassette receptacle ad; a receptacle conveying mechanism ah for performing a conveyance of the cassette receptacle ad within the loading/unloading chamber ab; and a holder accommodating chamber ai disposed between the load lock chamber h and the loading/unloading chamber ab, for accommodating the wafer boat f therein. Further, since other components of the example manufacturing apparatus 11 in FIG. 2 and their operations are already known (see Patent Document 2), their detailed description will be omitted. Furthermore, a chamber as shown in FIG. 1 of Patent Document 3 is desirable as a chamber for constituting the manufacturing apparatus 11.

Further, the manufacturing apparatus 11 stores therein, for example, a recipe (typically, a set of process condition values), which is information upon a specific process for the wafer, and the manufacturing apparatus 11 is controlled by using the recipe.

Further, the server device 12 constitutes a so-called group management system, and it stores therein various measurement information obtained by the plurality of manufacturing apparatuses 11 and has a function of performing a fault detection on the measurement information.

Further, the client device 13 sends various requests to the server device 12, and receives processed results from the server device 12.

FIG. 3 presents a block diagram of the group management system in accordance with the embodiment of the present invention. The group management system includes the one or more manufacturing apparatuses 11, the server device 12, and the client device 13.

The manufacturing apparatus 11 includes an input receiving unit 1101, a recipe storage unit 1102, a manufacturing apparatus identifier storage unit 1103, a product wafer number storage unit 1104, a processing unit 1105, a measuring unit 1106, a raw information accumulation unit 1107, and a raw information transmitting unit 1108.

The server device 12 includes a measurement information storage unit 1201, a raw information receiving unit 1202, a measurement information acquisition unit 1203, a measurement information accumulation unit 1204, an instruction receiving unit 1205, an output information composing unit 1206, an output unit 1207, an output instruction accumulation unit 1208, a condition information storage unit 1209 and a fault detection unit 1210.

The client device 13 includes an instruction input unit 1301, an instruction transmitting unit 1302, a receiving unit 1303 and a display unit 1304.

The input receiving unit 1101 receives various inputs from a user of the manufacturing apparatus 11. The inputs can be a recipe, a recipe identifier for identifying the recipe, a manufacturing apparatus identifier for identifying the manufacturing apparatus, the number of product wafers, the total number of wafers including the number of dummy wafers, a wafer manufacture instructions (process execution instructions) or the like. The number of product wafers indicates the number of wafers to be manufactured as products and is counted without including the number of dummy wafers. Further, the number of wafers capable of being accommodated in the manufacturing apparatus 11 is, for example, 50 or 30, and the number of the dummy wafers among them is 10 or 5. Among the wafers capable of being accommodated, there is no specific restriction in the number of the dummy wafers and the number of the product wafers. An input unit for receiving various inputs from the user can be any of various types, such as a ten key, a keyboard, a mouse, a menu screen or the like. The input receiving unit 1101 can be implemented by a device driver of the input unit such as a ten key or a keyboard, or menu screen control software.

The recipe storage unit 1102 stores therein the recipe for use in controlling the manufacturing apparatus 11. The recipe is information upon a specific process for the target substrate and typically includes a set of process parameter information. The process parameter information includes, e.g., a category name, an item name, a parameter name and a value. The category name indicates the kind of a process parameter, and it can be, for example, 「temperature」, 「gas flow rate」, 「speed of boat elevator」 or the like. The item name indicates the property of the process parameter, and it can be, for example, 「speed of vertical movement」, 「speed of rotation」 or the like. The parameter name indicates the name of the process parameter, and it can be, for example, 「C」, 「A」 or the like. The value indicates a value assigned to a variable called the process parameter. Typically, the recipe is stored in a pair with a recipe identifier (e.g., recipe name) for identifying the recipe. Though the recipe storage unit 1102 is desirably a non-volatile storage medium, it can also be implemented by a volatile storage medium.

The manufacturing apparatus identifier storage unit 1103 stores therein a manufacturing apparatus identifier for identifying the manufacturing apparatus 11. The manufacturing apparatus identifier may be information received by the input receiving unit 1101 or information previously stored in the manufacturing apparatus. Though the manufacturing apparatus identifier storage unit 1103 is desirably a non-volatile storage medium such as a hard disk, a ROM or the like, but it can also be a volatile storage medium such as a RAM or the like.

The product wafer number storage unit 1104 stores therein information indicating the number of the product wafers. Typically, the information indicating the number of the product wafers is a numerical value (e.g., 40), but it can also be a symbol corresponding to the numerical value. That is, the information indicating the number of the product wafers has the same meaning as the number of the product wafers. The number of the product wafers in the product wafer number storage unit 1104 is, for example, a numerical value received by the input receiving unit 1101. Further, the number of the product wafers in the product wafer number storage unit 1104 can also be, for example, information automatically obtained by a non-illustrated means. The non-illustrated means for obtaining the number of the product wafers is, for example, a means for calculating the number of the product wafers by detecting a color difference between surfaces of a product wafer and a dummy wafer through image processing. Typically, the surface of the product wafer has a different color from that of the dummy wafer. Alternatively, the non-illustrated means for obtaining the number of the product wafers can be, for example, a means for calculating the number of the product wafers by reading ID written on the product wafer through image processing. Besides the mentioned examples, the means for automatically obtaining the number of the product wafers can be implemented in any other ways. Though the product wafer number storage unit 1104 is desirably a non-volatile storage medium such as a hard disk, a ROM or the like, but it can also be a volatile storage medium such as a RAM or the like.

The processing unit 1105 reads a recipe of the recipe storage unit 1102 and performs a specific process on the wafer according to the recipe. Typically, the processing unit 1105 can be realized by an MPU, a memory or the like. The processing sequence of the processing unit 1105 is typically realized by software, which is stored in a storage medium such as a ROM. However, it is also possible to realize the processing sequence by using hardware (a dedicated circuit).

The measuring unit 1106 measures a temperature, a gas flow rate or a pressure within the manufacturing apparatus 11 and obtains raw information which becomes a basis of measurement information to be charted. The raw information is information such as a temperature measurement or the like. The raw information typically includes time information indicating measurement time. It is more desirable that the raw information includes a recipe identifier for identifying a recipe processed when the measuring unit 1106 measures the temperature or the like; measurement values; and time information indicating the measurement times. It is possible for the measuring unit 1106 to measure plural values such as a temperature and a gas flow rate, or temperatures at plural locations. That is, it is possible that the raw information include more than one kind of measurement values. The measuring unit 1106 can be realized by sensors such as one or more temperature sensors or one or more flow rate sensors.

The raw information accumulation unit 1107 accumulates the raw information obtained by the measuring unit 1106 in a non-illustrated storage medium. Typically, the raw information accumulation unit 1107 can be implemented by, e.g., an MPU and a memory. Typically, the processing sequence of the raw information accumulation unit 1107 is realized by software, which is stored in a storage medium such as a ROM. However, it is also possible to realize the processing sequence by using hardware (a dedicated circuit). Furthermore, though the non-illustrated storage medium is desirably a non-volatile storage medium, it can also be implemented by a volatile storage medium.

The raw information transmitting unit 1108 transmits the raw information accumulated by the raw information accumulation unit 1107 to the server device 12. Here, a trigger for the transmission of the raw information can be implemented in any of various ways. Further, the raw information transmitted by the raw information transmitting unit 1108 includes one or more kinds of measurement values (e.g., a temperature and a gas flow rate), time information, and the number of product wafers. Furthermore, it is more desirable that the raw information transmitted by the raw information transmitting unit 1108 includes a manufacturing apparatus identifier for identifying the manufacturing apparatus 11 or a recipe identifier for identifying a recipe. Further, the raw information transmitted by the raw information transmitting unit 1108 may include the total number of wafers including dummy wafers, and the like. That is, it is possible that the raw information accumulated by the raw information accumulation unit 1107 has a different structure or component from that of the raw information transmitted by the raw information transmitting unit 1108. Further, the raw information may include a single product wafer number, a single manufacturing apparatus identifier and a single recipe identifier for plural measurement values. The raw information transmitting unit 1108 can be realized by a wired or wireless communication means or the like. Furthermore, it may be possible that the raw information transmitting unit 1108 reads the number of the wafers from the product wafer number storage unit 1104 and adds it to the raw information prior to transmitting the raw information to the server device 12. Further, it may be also possible that the raw information transmitting unit 1108 reads the recipe identifier or the manufacturing apparatus identifier from the recipe storage unit 1102 or the manufacturing apparatus identifier storage unit 1103, respectively, and adds it to the raw information prior to transmitting the raw information to the server device 12. Furthermore, the raw information transmitting unit 1108 may transmit collected data (for example, data in which 10 measurement values are collected) obtained by sampling measured values (for example, gas flow rates) every second. Here, there is no specific limitation in a unit or a structure of the data transmitted by the raw information transmitting unit 1108. Furthermore, the process of composing the to-be-transmitted raw information can be carried out by the raw information accumulation unit 1107 instead of the raw information transmitting unit 1108. There is no specific limitation in transmission timing of information of a pair of one or more measurement values (e.g., a temperature and a gas flow rate) and time information, the number of the product wafers, the manufacturing apparatus identifier and the recipe identifier.

The measurement information storage unit 1201 can store therein a plurality of measurement information. The multiplicity of measurement information is time sequential information containing one or more kinds of information (e.g., a temperature or a pressure) measured in the plurality of manufacturing apparatuses 11 and having product wafer numbers indicating the number of product wafers manufactured by the manufacturing apparatuses 11 and time information indicating time. Further, the plurality of measurement information may be time sequential information containing one or more kinds of information measured in the plurality of manufacturing apparatuses 11 and having product wafer numbers, apparatus identifiers for identifying the manufacturing apparatuses 11 and time information. Furthermore, the plurality of measurement information may be time sequential information containing one or more kinds of information measured in the plurality of manufacturing apparatuses 11 and having product wafer numbers, recipe identifiers, and time information. The measurement information may be information acquired by performing a specific operation to a plurality of raw information received by the raw information receiving unit 1202 by the measurement information acquisition unit 1203 or it may be the same information as the raw information. Though the measurement information storage unit 1201 is desirably a non-volatile storage medium, it can also be implemented by a volatile storage medium. Further, the measurement information of the measurement information storage unit 1201 may be information accumulated by the measurement information accumulation unit 1204, information directly received from the manufacturing apparatuses 11 or information read from a non-illustrated storage medium.

The raw information receiving unit 1202 receives, from the plurality of manufacturing apparatuses 11, the raw information which is a basis of the plurality of measurement information. The raw information receiving unit 1202 can be implemented by a wireless or wired communication means or the like.

The measurement information acquisition unit 1203 acquires a plurality of measurement information by performing a specific operation to the plurality of raw information received by the raw information receiving unit 1202. The specific operation refers to an operation performed at a preset time interval to acquire, for example, a mean value, a maximum value, a minimum value, a standard deviation or a median of a multiplicity of values of the plurality of raw information. Further, the specific operation may be an operation performed to acquire, for example, a mean value, a maximum value, a minimum value, a standard deviation or a median of the multiplicity of values of the plurality of raw information in every preset steps within a recipe. The measurement information acquisition unit 1203 can be realized by, typically, an MPU and a memory. Typically, the processing sequence of the measurement information acquisition unit 1203 is implemented by software, which is stored in a storage medium such as a ROM or the like. Here, hardware (a dedicated circuit) may be also possible for the implementation.

The measurement information accumulation unit 1204 accumulates, in the measurement information storage unit 1201, the plurality of measurement information acquired by the measurement information acquisition unit 1203. Further, in case that the plurality of measurement information acquired by the measurement information acquisition unit 1203 is stored in the measurement information storage unit 1201, the accumulation process performed by the measurement information accumulation unit 1204 becomes to have the same meaning as an NOP (No Operation). Typically, the measurement information accumulation unit 1204 can be implemented by an MPU and a memory, or the like. The processing sequence of the measurement information accumulation unit 1204 is typically implemented by software, which is stored in a storage medium such as a ROM or the like. Here, hardware (a dedicated circuit) may be also possible for the implementation.

The instruction receiving unit 1205 receives instructions. Though the instructions are typically received from the client device 13, they can also be received from a keyboard, a mouse or the like connected with the server device 12. The instructions received by the instruction receiving unit 1205 include, for example, an output instruction for a chart including a product wafer number; an output instruction for a chart including a product wafer number and one or more apparatus identifiers; an output instruction for a chart including a product wafer number and one or more recipe identifiers; an output instruction for a chart including a product wafer number, one or more apparatus identifiers and one or more recipe identifiers; and the like. Further, the product wafer number in the output instruction for the chart including the product wafer number may be a range (e.g., 20 to 40) of the number of product wafers or may be the number (e.g., 40) of product wafers. The output instructions may include information upon the type of the chart (e.g., an SPC chart, a correlation chart, an MD chart or the like). Further, it may be possible that the output instructions include information upon the type of to-be-charted data (i.e., measurement information such as a temperature, a gas flow rate, a pressure or the like). Further, it may be also possible that the output instructions include information upon the property of dots and/or lines constituting the chart. To be more specific, the property information contains colors and types (shapes) of dots, colors and types of lines, and the like. In addition, in case that an output instruction includes a recipe identifier, the recipe identifier typically indicates a plurality of recipes having the same identifier of the plurality of apparatuses. The instruction receiving unit 1205 is made up of, for example, a wireless or wired receiving means. An input means for inputting the instructions can be implemented in various ways, and, for example, it can be a ten key, a keyboard, a mouse, a menu screen or the like. The instruction receiving unit 1205 may be implemented by a device driver of the input means such as the ten key or the keyboard, or control software of the menu screen, or the like.

The output information composing unit 1206 composes output information according to a determination result of the fault detection unit 1210. For example, the fault detection unit 1210 reads, from the measurement information storage unit 1201, a plurality of measurement information satisfying a condition of product wafer number included in an output instruction, and the output information composing unit 1206 composes a chart from the read plurality of measurement information. At this time, it is desirable that the output information composing unit 1206 composes the output information in which measurement information having a fault is visually distinguished from normal measurement information. Here, the output information is, for example, list information containing a name of the measuring unit and time related to the measurement information having the fault. Further, the output information is, for example, information upon a chart composed of the list information. The output information is, for example, information notifying normality or fault. The output information may be, for example, sound information (e.g., buzzer or the like) notifying either normality or fault. Further, the output information composing unit 1206 may perform a process of composing a chart showing ranges of fault values and normal values for fault detection. In such case, though the fault detection unit 1210 is supposed to read measurement information coincident with the output instruction, there is no restriction upon whether it performs a fault detecting process or not. When more than one apparatus identifier is contained in the output instruction, the output information composing unit 1206 desirably composes a chart in which measurement information of the different apparatus identifiers are visually distinguished from each other. Furthermore, when more than one recipe identifier is contained in the output instruction, the output information composing unit 1206 desirably composes a chart in which measurement information of the different recipe identifiers are visually distinguished from each other. Here, when the output instruction contains more than one apparatus identifier, the chart allowing the visual distinction between the measurement information of the different apparatus identifiers is a chart in which the measurement information of the different apparatus identifiers is outputted in different types (shapes such as a rectangle and a circle, colors, and sizes) of dots, a chart in which the measurement information of the different apparatus identifiers is connected by different colors of lines, or the like. Meanwhile, when the output instruction contains only one apparatus identifier, the chart allowing the visual distinction between the measurement information of the different apparatus identifiers implies a chart including a plurality of measurement information of that single apparatus identifier. Furthermore, when the output instruction contains more than one recipe identifier, the chart allowing the visual distinction between the measurement information of the different recipe identifiers is a chart in which the measurement information of the different recipe identifiers is outputted in different types (shapes such as a rectangle and a circle, colors and sizes) of dots, a chart in which the measurement information of the different recipe identifiers is connected by different types of lines (a solid line, a dashed line, and so forth), or the like. Meanwhile, when the output instruction contains only one recipe identifier, the chart allowing the visual distinction between the measurement information of the different recipe identifiers implies a chart including a plurality of measurement information of that single recipe identifier. Moreover, the output information composing unit 1206 may compose, from the read plurality of measurement information, an SPC chart (single-variable fault detection chart) which is a chart allowing a visual distinction of the measurement information of the different apparatus identifiers and plotting the read plurality of measurement information according to a time sequence indicated by the time information of any one type of measurement information. The SPC chart is a chart for performing fault detection by monitoring the single variable. On the SPC chart, it is desirable that a maximum value and a minimum value (management values) of a target object to be monitored are preset (stored in the condition information storage unit 1209 in advance), and when a monitored value falls beyond the range of such management values, the fault detection unit 1210 detects a fault and the detected fault is visually displayed. Furthermore, when the output instruction contains one or more apparatus identifiers, the output information composing unit 1206 may compose, from a plurality of measurement information having any one of the one or more apparatus identifiers, a correlation chart (two-variable fault detection chart) which is a chart capable of visually distinguishing the measurement information of the different apparatus identifiers and showing a correlation between two kinds of measurement information. The correlation chart is a chart for monitoring a correlation between two variables. Furthermore, when the output instruction contains one or more recipe identifiers, the output information composing unit 1206 may compose, from a multiplicity of measurement information having any one of the one or more recipe identifiers, an MD chart which is a chart capable of visually distinguishing the measurement information of the different recipe identifiers and showing a correlation between three or more kinds of measurement information. The chart composition is a process of acquiring a chart by, for example, connecting a plurality of measurement information by a line along a time axis. Since a method of composing a chart when a plurality of measurement information having values and time information is given is well-known, a detailed description thereof will be omitted. Further, since a method of composing an SPC chart, a correlation chart and an MD chart when a plurality of measurement information having values and time information is given is well-known, a detailed description thereof will be omitted. Here, the two kinds of measurement information also include information containing two kinds of measurement values (for example, a temperature and a gas flow rate) within single measurement information. Further, the three or more kinds of measurement information also include information containing three or more kinds of measurement values (for example, a temperature, a gas flow rate and a pressure) within single measurement information. Typically, the output information composing unit 1206 can be implemented by an MPU, software, or the like. The processing sequence of the output information composing unit 1206 is typically realized by software, which is stored in a storage medium such as a ROM. However, it is also possible to use hardware (a dedicated circuit) for the realization.

The output unit 1207 outputs the chart composed by the output information composing unit 1206. Here, the term "output" typically implies a transmission to the client device 13. However, the output unit 1207 can also display the chart on a display device connected with the server device 12, print it by a printer or transmit it to an external device. The output unit 1207 can be implemented by a wireless or wired communication means. However, it is also possible to implement the output unit 1207 by driver software of an output device, or driver software of the output device together with the output device, or the like.

The output instruction accumulation unit 1208 accumulates therein an output instruction having property information of a dot and/or a line and an apparatus identifier, or property information of a dot and/or a line and a recipe identifier, or the like. For example, when the instruction receiving unit 1205 has received an accumulation instruction for accumulating a setup (including color information) of a chart, the output instruction accumulation unit 1208 may accumulate therein an output instruction having property information of a dot and/or a line and an apparatus identifier or property information of a dot and/or a line and a recipe identifier. Furthermore, the output instruction accumulation unit 1208 can be typically implemented by an MPU, a memory, or the like. The processing sequence of the output instruction accumulation unit 1208 is typically realized by software, which is stored in a storage medium such as a ROM. However, it is also possible to use hardware (a dedicated circuit) for the realization.

The condition information storage unit 1209 stores therein condition information related to conditions for the fault detection. The condition information includes, for example, a maximum value and a minimum value defining a normal range of measurement values. The condition information may include, for example, only a maximum value between a normal value and a fault value. Besides, the condition information may be varied depending on values to be measured (a temperature, a pressure, a gas flow rate, and so forth). In addition, there is no specific restriction in a structure of the condition information. Though the condition information storage unit 1209 is desirably a non-volatile storage medium, it can also be implemented by a volatile storage medium.

The fault detection unit 1210 determines whether the measurement values of the measurement information of the measurement information storage unit 1201 are normal or abnormal. The fault detection unit 1210 determines whether the measurement values of the measurement information are normal or abnormal by using the condition information of the condition information storage unit 1209. To elaborate, when the instruction receiving unit 1205 has received the output instruction, the fault detection unit 1210 reads, from the measurement information storage unit 1201, a plurality of measurement information satisfying a condition of product wafer number contained in the output instruction, and determines whether each of the read plurality of measurement information satisfies the condition information. Further, when the instruction receiving unit 1205 has received the output instruction, the fault detection unit 1210 reads, from the measurement information storage unit 1201, a multiplicity of measurement information satisfying the condition of product wafer number contained in the output instruction and having any one of one or more apparatus identifiers contained in the output instruction, and determines whether each of the read measurement information satisfies the condition information.

Furthermore, when the instruction receiving unit 1205 has received the output instruction, the fault detection unit 1210 reads, from the measurement information storage unit 1201, a plurality of measurement information satisfying the condition of product wafer number contained in the output instruction and having any one of one or more recipe identifiers contained in the output instruction, and determines whether each of the read measurement information satisfies the condition information. Typically, the fault detection unit 1210 can be implemented by an MPU, a memory, or the like. The processing sequence of the fault detection unit 1210 is typically realized by software, which is stored in a storage medium such as a ROM. However, it is also possible to use hardware (a dedicated circuit) for the realization. Moreover, the fault detection process in the fault detection unit 1210 may be realized by a well-known fault detection process.

The instruction input unit 1301 inputs various instructions. The various instructions include, for example, an instruction of startup, an instruction of chart output, an instruction of change of chart property values (type and color of lines, type and color of dots, and so forth), or the like. A means for inputting the instructions can be a ten key, a keyboard, a mouse, a menu screen or the like, though not limited thereto. The instruction input unit 1301 can be implemented by the input means such as the ten key, the keyboard or the like, a device driver thereof, control software of the menu screen, or the like.

The instruction transmitting unit 1302 transmits the instruction inputted by the instruction input unit 1301 to the server device 12. Here, the term "transmitting" typically means a transmission by a communication means. The instruction transmitting unit 1302 can be implemented by a wired or wireless communication means or the like.

The receiving unit 1303 receives information of the chart from the server device 12. Here, the term "receiving" typically means reception by a communication means. The receiving unit 1303 can be implemented by a wired or wireless communication means or the like.

The display unit 1304 displays, on a display, the information of the chart received by the receiving unit 1303. The display unit 1304 may or may not include the display. It is possible to realize the display unit 1304 by driver software of the display, driver software of the display together with the display, or the like.

Hereinafter, an operation of the group management system will be explained. First of all, an operation of the manufacturing apparatus 11 will be explained with reference to a flowchart shown in FIG. 4.

(Step S401) The processing unit 1105 reads a recipe from the recipe storage unit 1102.

(Step S402) The processing unit 1105 substitutes 1 for a counter i.

(Step S403) The processing unit 1105 determines whether or not $i^{th}$ process step exists in the recipe read at step S401. If the $i^{th}$ process step exists, the process proceeds to step S404; otherwise, the process proceeds to step S409.

(Step S404) The processing unit 1105 performs the $i^{th}$ process step.

(Step S405) The measuring unit 1106 performs one or more kinds of predetermined measurement (e.g., a temperature and a pressure) and acquires raw information (here, the raw information only includes one or more kinds of values, typically).

(Step S406) The measuring unit 1106 acquires time information from a non-illustrated clock and composes raw information by applying the time information to the measurement information.

(Step S407) The raw information accumulation unit 1107 accumulates the raw information obtained in step S406 in a non-illustrated memory temporarily.

(Step S408) The raw information transmitting unit 1108 transmits, to the server device 12, the raw information (a pair of the one or more kinds of values and the time information) accumulated temporarily in step S407. Further, the raw information transmitting unit 1108 retains therein information (e.g., an IP address of the sever device 12 and the like) necessary to communicate with the sever device 12.

(Step S409) The processing unit 1105 increments the counter i by 1 and the process returns to step S403.

(Step S410) The raw information transmitting unit 1108 reads the number of product wafers from the product wafer number storage unit 1104.

(Step S411) The raw information transmitting unit 1108 reads a recipe identifier from the recipe storage unit 1102. The recipe identifier corresponds to the recipe read in step S401.

(Step S412) The raw information transmitting unit 1108 reads a manufacturing apparatus identifier from the manufacturing apparatus identifier storage unit 1103.

(Step S413) The raw information transmitting unit 1108 transmits the number of product wafers, the recipe identifier and the manufacturing apparatus identifier read in step S410 to step S412 to the server device 12. Further, the raw information transmitting unit 1108 retains therein information (e.g., the IP address of the server device 12 and the like) necessary to communicate with the server device 12.

Furthermore, in the flowchart of FIG. 4, it may be possible to transmit plural pairs of the one or more kinds of values and the time information contained in the transmitted raw information, the number of the product wafers, the recipe identifier and the manufacturing apparatus identifier all together to the server device 12.

Hereinafter, the operation of the server device 12 will be explained with reference to a flowchart of FIG. 5.

(Step S501) The instruction receiving unit 1205 determines whether an instruction has been received. If so, the process proceeds to step S502; otherwise, the process proceeds to step S508.

(Step S502) The fault detection unit 1210 determines whether the instruction received in step S501 is a chart output instruction. If so, the process proceeds to step S503; otherwise, the process goes back to step S501.

(Step S503) The fault detection unit 1210 obtains a product wafer number (or a range of the product wafer number), a product wafer number and one or more apparatus identifiers, a product wafer number and one or more recipe identifiers, or a product wafer number and one or more apparatus identifiers and one or more recipe identifiers contained in the instruction received in step S501. Further, when the instruction received in step S501 has other property values such as a total wafer number and the like, the fault detection unit 1210 obtains such other property values.

(Step S504) The fault detection unit 1210 acquires one or more measurement information by searching the measurement information storage unit 1201 by using the product wafer number (or the range of the product wafer number) obtained in step S503 or the like as a key. Further, the measurement information at least includes a value (a temperature, a gas flow rate, or the like), time information and the product wafer number. Furthermore, searching by using the one or more apparatus identifiers as a key implies acquiring measurement information having any one of the one or more apparatus identifiers. Moreover, searching by using the one or more recipe identifiers implies acquiring one or more measurement information having any one of the one or more recipe identifiers.

(Step S505) The fault detection unit 1210 determines whether each measurement value contained in the one or more measurement information obtained in step S504 is normal or abnormal. The fault detection unit 1210 determines the normality or fault of each measurement value by using condition information.

(Step S506) The output information composing unit 1206 composes output information such as a chart according to the output instruction received from the measurement information obtained in step S504. Further, in case that the output information is a chart, property values of lines (colors or types of lines, colors or types of dots, and so forth) of the chart are instructed property values, property values of default, or the like, and the output information composing unit 1206 composes the chart by using these property values. The composed chart is a chart in which the measurement information of the different apparatus identifiers and/or the measurement information of the different recipe identifiers are visually distinguishable. Furthermore, the composed chart is a chart according to chart type information (an SPC chart, a correlation chart, an MD chart, or the like) contained in the output instruction. Moreover, the output information composing unit 1206 composes the output information according to the result of the fault detection process in step S505. Here, the "output information according to the result of the fault detection process" may be output information specifying the fault or normality of the measurement information or a chart specifying threshold values of the fault and normality, or the like.

(Step S507) The output unit 1207 outputs the output information composed in step S505. Here, the term "output" implies a transmission to the client device 13. Then, the process returns to step S501.

(Step S508) The raw information receiving unit 1202 determines whether it has received pairs of one or more values and time information from the manufacturing apparatuses 11. If so, the process proceeds to step S509; otherwise, the process proceeds to step S510.

(Step S509) The raw information receiving unit 1202 additionally writes the pairs of one or more values and time information received in step S508 in a non-illustrated memory. Then, the process returns to step S501.

(Step S510) The raw information receiving unit 1202 determines whether the property values such as the product wafer number have been received from the manufacturing apparatuses 11. If so, the process goes to step S511; otherwise, the process goes back to step S501. The property values such as the product wafer number may be, for example, the product wafer number, the apparatus identifiers and the recipe identifiers.

(Step S511) The raw information receiving unit 1202 composes raw information by adding the property values such as the product wafer number received in step S510 to the plural pairs of one or more values and time information additionally written in the memory. Here, a plurality of raw information is composed. Further, single property value such as the product wafer number may be assigned to the plural pairs of one or more values and time information or may be assigned to each pair of one or more values and time information. That is, there is no specific restriction in a data structure of the raw information.

(Step S512) The measurement information acquisition unit 1203 acquires one or more measurement information by performing a preset calculation on the plurality of raw information composed in step S511. Performing the preset calculation on the plurality of raw information implies performing the preset calculation (calculation of a mean value, a standard deviation, a maximum value, or the like) to each of the one or more values in the plural pairs of the plurality of raw information. Furthermore, the plurality of raw information on which the specific calculation is performed implies each of a multiplicity of raw information obtained at a predetermined time interval (for example, 10 minutes) and each of a multiplicity of raw information obtained at every preset number of steps.

(Step S513) The measurement information accumulation unit 1204 accumulates the one or more measurement information acquired in step S512 in the measurement information storage unit 1201. Then, the process goes back to step S501.

Further, in the flowchart of FIG. 5, the process is terminated by an interruption of a power-off or a process termination.

Further, in the flowchart of FIG. 5, the raw information and the measurement information may be the same information. In such case, in step S512, a process of reading the raw information is performed.

Furthermore, in the flowchart of FIG. 5, the measurement information is accumulated before the chart output instruction is received.

Further, in the flowchart of FIG. 5, it may be possible that the raw information is accumulated, and when an output of the output information such as the chart is carried out, the one or more measurement information is obtained by performing the preset calculation on the plurality of raw information, and the output information is composed by using the one or more measurement information and outputted. That is, there is no specific limitation in timing for composing the measurement information.

Moreover, in the flowchart of FIG. 5, it is desirable that the fault detection is started on a real time basis as a result of a user inputting an output instruction of the output information including the product wafer number condition, and the fault detection process is performed while updating the output information (chart or the like) whenever the raw information is received, and a fault, if any, is immediately informed to the user. That is, in the flowchart of FIG. 5, it is more desirable to perform the following processes. That is, the raw information receiving unit 1202 keeps on receiving the raw information from the manufacturing apparatuses 11 on a real time basis (during the manufacture in the manufacturing apparatuses 11); the measurement information acquisition unit 1203 keeps on composing the measurement information from the raw information; the measurement information accumulation unit 1204 stores the measurement information in the measurement information storage unit 1201 at least temporarily; the fault detection unit 1210 performs the fault detection process on the continuously composed measurement information; the output information composing unit 1206 updates the output information; and the output unit 1207 keeps on outputting the updated output information. By these processes, a real-time fault detection can be carried out, so that the user can be allowed to acknowledge an occurrence of a fault immediately.

Hereinafter, the operation of the client device 13 will be explained. When the instruction input receiving unit 1301 of the client device 13 receives various instructions from the user, the instruction transmitting unit 1302 transmits the various instructions to the server device 12, and the receiving unit 1303 receives information upon a chart, which is processed results, from the server device 12, and then the display unit 1304 displays the chart.

Hereinafter, a detailed operation of the group management system in accordance with the present embodiment will be explained. FIG. 1 provides a conceptual diagram of the group management system.

In this example, when the input receiving unit 1101 of each of the plurality of the manufacturing apparatuses 11 receives a startup instruction for manufacturing a wafer or the like from the user, the processing unit 1105 reads a recipe from the recipe storage unit 1102 and performs a manufacturing process by executing the read recipe. Further, during the wafer manufacturing process, the measuring unit 1106 measures the temperature of an upper part within a predetermined furnace at an interval of, e.g., one second, and the raw information transmitting unit 1108, transmits a pair of an acquired gas flow rate and time information acquired by a non-illustrated clock to the server device 12 at an interval of, e.g., one second. An example of the transmitted raw information is shown in FIG. 6. Here, the raw information includes the gas flow rate and the time information. Further, the time information is information indicating time, and it may include hour, minute and second or just include date and hour.

Furthermore, at the step when all the steps of the recipe are finished, the raw information transmitting unit 1108 in the manufacturing apparatuses 11 reads the manufacturing apparatus identifiers in the manufacturing apparatus identifier storage unit 1103, the recipe identifiers (recipe identifiers executed when a preset process is performed on a target substrate) in the recipe storage unit 1102 and the product wafer numbers in the product wafer number storage unit 1104, and transmits them to the server device 12.

Thereafter, the raw information receiving unit 1202 of the server device 12 receives, e.g., at an interval of one second, information of a pair of a gas flow rate and time information in sequence and accumulates them temporarily. Further, it receives the manufacturing apparatus identifiers, the recipe identifiers and the product wafer numbers. Further, the raw information receiving unit 1202 stores raw information containing a plurality of pairs of the gas flow rate and the time information, the product wafer numbers, the recipe identifiers and the manufacturing apparatus identifiers in a memory temporarily. An example of the raw information is shown in FIG. 7. FIG. 7 provides a raw information management table. The raw information management table includes [manufacturing apparatus identifier], [recipe identifier], [product wafer number] and [value (gas flow rate)] and [time information]. FIG. 7 shows a data structure in which a plurality of values (here, only one kind of value) and the time information correspond to a single manufacturing apparatus identifier, a single recipe identifier and a single product wafer number. Further, in FIG. 7, the raw information corresponding to the execution of the plurality of manufacturing apparatuses 11 and the plurality of recipes are managed.

Subsequently, the measurement information acquisition unit 1203 acquires a plurality of raw information for the same manufacturing apparatus identifier, the same recipe identifier and the same product wafer number, and acquires a plurality of measurement information by performing a specific calculation on the plurality of raw information. Here, the specific calculation is a calculation of a mean value, and the measurement information acquisition unit 1203 calculates the mean value every hour. Further, the measurement information acquisition unit 1203 acquires a measurement information management table shown in FIG. 8 from the raw information management table of FIG. 7.

Thereafter, the measurement information accumulation unit 1204 accumulates, in the measurement information storage unit 1201, the measurement information management table of FIG. 8 acquired by the measurement information acquisition unit 1203.

By repeating the above-described process, a great amount of measurement information is stored in the measurement information storage unit 1201.

Further, in the condition information storage unit 1209, there is stored condition information [300<=gas flow rate<=350] for determining normality/fault of a gas flow rate within a furnace. The condition information [300<=gas flow rate<=350] indicates that a gas flow rate ranging from 300 to 350 is normal. That is, the condition information [300<=gas flow rate<=350] indicates that a gas flow rate smaller than 300 and larger than 350 is abnormal.

Under this circumstance, the user inputs necessary information on a screen shown in FIG. 9 from the client device 13 and presses a button of [chart output]. FIG. 9 is a screen for outputting the chart by inputting the chart output instruction. Here, the necessary information includes a data type (a kind of data of the measurement information: for example, a gas flow rate, a temperature, a pressure, or the like) and at least one of wafer number information, a manufacturing apparatus identifier and a recipe identifier. Typically, the data type is necessary. Further, on the screen of FIG. 9, it may be possible to input only the data type and the wafer number information. Moreover, on the screen of FIG. 9, it may be also possible to input only the data type and the manufacturing apparatus identifier or only the data type and the recipe identifier. FIG. 9 illustrates an input of a data type [gas flow rate], a product wafer number [35 to 40], a manufacturing apparatus identifier [E1], and a recipe identifier [R1] or [R5]. The product wafer number is recognized by selecting a toggle of [only product]. Accordingly, if the user presses the button [chart output] under this circumstance, the instruction input unit 1301 receives an output instruction for outputting measurement information satisfying the conditions of [35<=product wafer number<=40], [manufacturing apparatus identifier=E1] and [recipe identifier=R1 or R5] among the measurement information (e.g., information shown in FIG. 8) of the [gas flow rate]. Further, an example of this output instruction may be, for example, [chart output data type="gas flow rate" and 35<=product wafer number<=40 and manufacturing apparatus identifier "E1" and recipe identifier="R1" or "R2"].

Subsequently, the instruction transmitting unit 1302 transmits the output instruction □chart output data type="gas flow rate" and 35<=product wafer number<=40 and manufacturing apparatus identifier="E1" and recipe identifier="R1" or "R2"□ to the server device 12.

Then, the instruction receiving unit 1205 of the server device 12 receives the output instruction □chart output data type="gas flow rate" and 35<=product wafer number<=40 and manufacturing apparatus identifier="E1" and recipe identifier="R1" or "R2"□.

Thereafter, the fault detection unit 1210 of the server device 12 searches for and acquires measurement information coincident with the output instruction □chart output data type="gas flow rate" and 35<=product wafer number<=40 and manufacturing apparatus identifier="E1" and recipe identifier="R1" or "R2"□ from the measurement information stored in the measurement information storage unit 1201. To be more specific, the fault detection unit 1210 searches for a record satisfying □35<=product wafer number<=40 and manufacturing apparatus identifier="E1" and recipe identifier="R1" or "R2"□ from the measurement information management table shown in FIG. 8. As a result, the fault detection unit 1210 obtains information illustrated in FIG. 10.

Then, the fault detection unit 1210 reads the condition information [300<=gas flow rate<=350] from the condition information storage unit 1209, and detects fault of the measurement information of FIG. 10 by using the condition information. Since all of mean values in the information of FIG. 10 are less than 300, they are determined as fault values.

Thereafter, the output information composing unit 1206 composes a chart as output information by using the information in FIG. 10 and the determination result of the fault detection unit 1210. The chart is a line graph in which a horizontal axis represents time indicating time information and a vertical axis represents a value (mean value of gas flow rates).

Afterwards, the output unit 1207 transmits the line graph composed by the output information composing unit 1206 to the client device 13.

Then, the receiving unit 1303 of the client device 13 receives the line graph, and the display unit 1304 displays the line graph on a display, as shown in FIG. 11. In FIG. 11, a normal range is marked by hatching.

By the above-described process, since the user can be informed of the manufacturing status of the manufacturing apparatus based on only the values measured under the condition containing the desired product wafer number, a detection of a fault of the manufacturing apparatus can be carried out very effectively. To elaborate, since a resistance in case of flowing a gas is different depending on the number of the product wafers, a frequency of occurrence of a fault, a kind of the fault or the like may be varied resultantly. To cope with such situation, a highly accurate fault detection can be carried out by detecting the manufacturing status of the manufacturing apparatus based on only the values measured under the condition containing the desired product wafer number. Further, on the line graph of FIG. 11, when the number of the product wafers is great, ranging from 35 to 40, the gas flow rate becomes smaller than the normal range (for example, 300 is set as a minimum value of a normal state), so that it can be determined that a likelihood of generation of product failure is high.

Further, in FIG. 9, in case that the user selects [all] for the wafer number, the measurement information is searched under the condition containing a total wafer number consisting of the dummy wafer number and the product wafer number. In such case, the measurement information contains a property value of total wafer number.

Moreover, in FIG. 9, the user can designate the condition including the wafer number (a product wafer number or a total wafer number), the one or more manufacturing apparatus identifiers and the one or more recipe identifiers in any of various ways. That is, the user can obtain a chart output by designating only the product wafer number, or by designating only the product wafer number and the one or more manufacturing apparatus identifiers, or by designating only the product wafer number and the one or more recipe identifiers, or by designating the product wafer number, the one or more manufacturing apparatus identifiers and the one or more recipe identifiers. In such cases, a process for outputting the chart is identical with the above-described process. Moreover, in FIG. 9, though the designated wafer number is information having the range (both boxes of "From" and "To" are checked), only one value can be designated.

As described above, in accordance with the present embodiment, it is possible to compose a chart by filtering measurement information by using a product wafer number, and, as a result, a highly accurate fault detection can be carried out. To be specific, though it is typical that a wiring is connected to a product wafer while it is not connected to a dummy wafer, a resistance in case of flowing a gas may be varied depending on, for example, a product wafer number, so that a frequency of occurrence of a fault, a kind of the fault, or the like may be varied as well. In accordance with the present embodiment, it is possible to realize a chart output, allowing a fault detection capable of coping with such circumstances. To be more specific, since the fault detection is carried out by filtering the measurement information while using the number of the product wafers without including the number of the dummy wafers as a key, non-uniformity of the measurement information can be reduced, so that threshold values of a determination of the fault can be set to be in a smaller range. As a result, a highly accurate fault detection is enabled.

In addition, in the present embodiment, the outputted chart may be an SPC chart, as illustrated in FIG. 12, visually distinguishing the measurement information of the different apparatus identifiers and/or different recipe identifiers among a plurality of measurement information read from the measurement information storage unit 1201 to be coincident with an output instruction (an instruction for outputting an SPC chart), and plotting the read plurality of measurement information according to a time sequence indicated by time information included in any one kind of measurement information. Further, the SPC chart shown in FIG. 12 is a chart including, for example, measurement information of a single apparatus identifier. Further, on the SPC chart shown in FIG. 12, a management value (maximum) and a management value (minimum) are outputted. When a certain measurement value is out of the range of these management values, it indicates that there is a fault. The management value (maximum) and the management value (minimum) are previously retained in the condition information storage unit 1209.

Moreover, in the present embodiment, the outputted chart may be a correlation chart, as shown in FIG. 13, visually distinguishing the measurement information of the different apparatus identifiers and/or different recipe identifiers among a plurality of measurement information read from the measurement information storage unit 1201 to be coincident with an output instruction (an instruction for outputting a correlation chart), and showing a correlation between two kinds of measurement information (for example, a temperature and a pressure, and the like). Further, the correlation chart shown in FIG. 13 is a chart including, for example, two kinds of measurement information of a single apparatus identifier. Further, on the correlation chart shown in FIG. 13, two management values are outputted. When a certain measurement value is out of the range of the two management values, it indicates that there is a fault.

Further, in the present embodiment, the outputted chart may be an MD chart, as illustrated in FIG. 14, visually distinguishing the measurement information of the different apparatus identifiers and/or different recipe identifiers among a plurality of measurement information, which is read from the measurement information storage unit 1201 and includes any one of one or more apparatus identifiers and/or any one of one or more recipe identifiers contained in an output instruction (an instruction for outputting an MD chart), and showing a correlation between three or more kinds of measurement information (for example, a gas flow rate, a pressure and a temperature at two locations). Further, the MD chart shown in FIG. 14, may be a chart including, for example, measurement information of a single apparatus identifier. Furthermore, the MD chart shown in FIG. 14 is a chart in which a fault determination is carried out by using a Mahalanobis distance. To be more specific, the MD chart illustrated in FIG. 14 is a chart which modelizes data in a normal state and shows a degree of fault as a numerical value by using the Mahalanobis distance.

Further, on the MD chart shown in FIG. 14, two management values are outputted. When a certain measurement value is out of the range of the two management values, it indicates that there is a fault.

Further, in the example of the present embodiment, the outputted chart is the single line graph showing the measurement information of the one apparatus identifier or the one recipe identifier and connecting the read plurality of measurement information according to the time sequence indicated by the time information contained in any one kind of measurement information. However, the outputted chart may be, as shown in FIG. 15, three individual charts visually distinguishing the measurement information of different apparatus identifiers among a plurality of measurement information read from the measurement information storage unit 1201 and having three apparatus identifiers contained in an output instruction, and plotting the read plurality of measurement information according to a time sequence indicated by time information contained in any one kind of measurement information. In this case, the output instruction includes three apparatus identifiers, for example, [apparatus A], [apparatus B] and [apparatus C]. The fault detection unit 1210 acquires measurement information three times by searching the measurement information storage unit 1201 three times by means of using each of [apparatus A], [apparatus B] and [apparatus C] as a key, and the output information composing unit 1206 composes, for each key, a chart having different property values of dots or lines, thus obtaining the three charts. Then, the three charts are outputted.

In the present embodiment, since the display type of the three or more charts (the SPC chart, the correlation chart, the MD chart, and the like) can be freely selected as described above, a circumstantial analysis according to the result of the entire inspection is enabled.

Moreover, in the example of the present embodiment, it may be possible that the raw information or the measurement information is previously retained in the server device 12. In such case, the raw information or the measurement information is acquired from the manufacturing apparatuses 11 by a non-illustrated means and transmitted to the server device 12 via a storage medium or the like.

Furthermore, in the present embodiment, it may be desirable that the user inputs an instruction for enlarging a portion of a chart under observation and changes a scale of a part of the chart (changes a time interval of measurement information or an interval of steps), and then outputs the chart.

Further, in the present embodiment, it may be possible that the measurement information has the same constitution as the raw information. In such case, the measurement information acquisition unit and the measurement information accumulation unit become unnecessary.

In addition, in the present embodiment, a transception of the raw information between the manufacturing apparatuses and the server device is not essential. The raw information can be sent to the server device from the manufacturing apparatuses via, for example, a storage medium.

Furthermore, in the present embodiment, the group management system may not have the client device 13. In such case, the user may input an instruction such as an output instruction and the like on the server device 12.

Moreover, in the example of the present embodiment, though the charts are outputted by designating the apparatus identifier or the recipe identifier, it may be also possible to output a chart by designating one or more apparatus identifiers and one or more recipe identifiers. In case that the user inputs an output instruction including the one or more apparatus identifiers and the one or more recipe identifiers, the fault detection unit 1210 searches for measurement information (or raw information) by using each of the designated one or more apparatus identifiers and one or more recipe identifiers as a key and detects a fault therefrom, and the output information composing unit 1206 composes a chart.

In addition, in the present embodiment, it may be very desirable to perform a fault detection process on a real-time basis by being triggered upon receiving the output instruction by the instruction receiving unit and to update the output information (chart and the like) whenever the raw information is received because the user can be informed of a fault as soon as the fault occurs. Further, such real-time fault detection can be carried out as follows. That is, the fault detection unit immediately determines whether the measurement information kept being acquired by the measurement information acquiring unit coincides with the condition information, and the output information composing unit keeps on composing the output information according to a determination result of the fault detection unit, and the output unit keeps on outputting the output information composed by the output information composing unit, while updating them.

Moreover, the process of the present embodiment can be realized by software. Further, the software can be distributed in a way of software download or the like. Further, it is also possible to record this software in a storage medium such as a CD-ROM and distribute it. Moreover, the software for executing the server device in the present embodiment is a program as follows. That is, the program is a program for storing plural measurement information, which is time sequential information measured in a plurality of manufacturing apparatuses for performing a preset process on a target substrate and has a product wafer number indicating the number of product wafers manufactured in the manufacturing apparatuses and time information indicating time, wherein the program executes on a computer: an instruction receiving step for receiving an output instruction for output information, which includes a product wafer number condition related to the product wafer number; a fault detecting step for, when the output instruction is received in the instruction receiving step, reading a multiplicity of measurement information satisfying the product wafer number condition contained in the output instruction, and determining whether the read multiplicity of measurement information satisfies stored condition information; an output information composing step for composing the output information according to a determination result in the fault detecting step; and an outputting step for outputting the output information composed in the output information composing step.

Further, it is desirable that, in the program, the measurement information is time sequential information measured in the plurality of manufacturing apparatuses and has apparatus identifiers for identifying the manufacturing apparatuses, the product wafer number and the time information; the output instruction for the output information includes the product wafer number condition and one or more apparatus identifiers; and in the fault detecting step, when the output instruction is received in the instruction receiving step, read is a number of measurement information satisfying the product wafer number condition contained in the output instruction and having any one of the one or more apparatus identifiers contained in the output instruction, and determined is whether the read plural measurement information satisfies the condition information.

Furthermore, it is desirable that, in the program, the measurement information is time sequential information measured in the plurality of manufacturing apparatuses and has recipe identifiers for identifying recipes, the product wafer number and the time information; the output instruction for the output information includes the product wafer number condition and one or more recipe identifiers; and in the fault detecting step, when the output instruction is received in the instruction receiving step, read is a number of measurement information satisfying the product wafer number condition contained in the output instruction and having any one of the one or more recipe identifiers contained in the output instruction, and determined is whether the read measurement information satisfies the condition information.

Still further, the program may further execute on the computer: a raw information receiving step for receiving raw information serving as a basis of the plural measurement information, from the plurality of manufacturing apparatuses; a measurement information acquiring step for acquiring the plural measurement information by performing a preset calculation on a number of raw information received in the raw information receiving step; and a measurement information accumulating step for accumulating the plural measurement information acquired in the measurement information acquiring step.

Further, in the output information composing step of the program, it may be desirable to compose, from the measurement information read in the fault detecting step, an SPC chart visually distinguishing the measurement information of the different apparatus identifiers and plotting the read measurement information according to a time sequence indicated by the time information contained in one kind of measurement information.

Furthermore, in the output information composing step of the program, it may be desirable to compose, from the measurement information read in the fault detecting step, a correlation chart visually distinguishing the measurement information of the different apparatus identifiers and showing a correlation between two kinds of measurement information.

Still further, in the output information composing step of the program, it may be desirable to compose, from the measurement information read in the fault detecting step, an MD chart visually distinguishing the measurement information of the different apparatus identifiers and showing a correlation between three or more kinds of measurement information.

Moreover, in the output information composing step of the program, it may be desirable to compose, from the measurement information read in the fault detecting step, an SPC chart visually distinguishing the measurement information of the different recipe identifiers and plotting the read measurement information according to a time sequence indicated by the time information contained in one kind of measurement information.

Further, in the output information composing step of the program, it may be desirable to compose, from the measurement information read in the fault detecting step, a correlation chart visually distinguishing the measurement information of the different recipe identifiers and showing a correlation between two kinds of measurement information.

Furthermore, in the output information composing step of the program, it may be desirable to compose, from the measurement information read in the fault detecting step, an MD chart visually distinguishing the measurement information of the different recipe identifiers and showing a correlation between three of more kinds of measurement information.

Further, in accordance with each embodiment, it is possible to perform each process (each function) through centralized processing by a single apparatus (system), or through distributed processing by a plurality of apparatuses.

Further, in an information transmitting step or an information receiving step, a process executed by hardware, for example, a process executed by a modem, an interface card or the like (a process executed only by hardware) during the transmitting step is not included in the above-mentioned program.

Further, one or more computers can be used to execute the program. That is, centralized processing or distributed processing can be performed.

Further, in each embodiment, two or more communication means (the raw information receiving unit, the output unit, or the like) in a single apparatus can be implemented physically by a single means.

The present invention is not limited to the above-mentioned embodiments and can be modified in various ways, and it shall be understood that all the modifications are included in the scope of the present invention.

Further, the disclosure including the specification, drawings and claims of Japanese Patent Application Ser. No. 2006-129729, filed on May 9, 2006, is hereby incorporated by reference in its entirety in the present disclosure.

INDUSTRIAL APPLICABILITY

As stated above, the server device in accordance with the present invention has an effect of filtering measurement information by using the number of product wafers as a key, and it is advantageous when it is applied to a group management system having a plurality of manufacturing apparatuses for performing a preset process on a target substrate and the server device connected to the plurality of manufacturing apparatuses.

BRIEF DESCRIPTION OF THE DRAWINGS

FIG. 7 illustrates a raw information management table in accordance with the embodiment of the present invention;

FIG. 8 illustrates a measurement information management table in accordance with the embodiment of the present invention;

Figure 1:
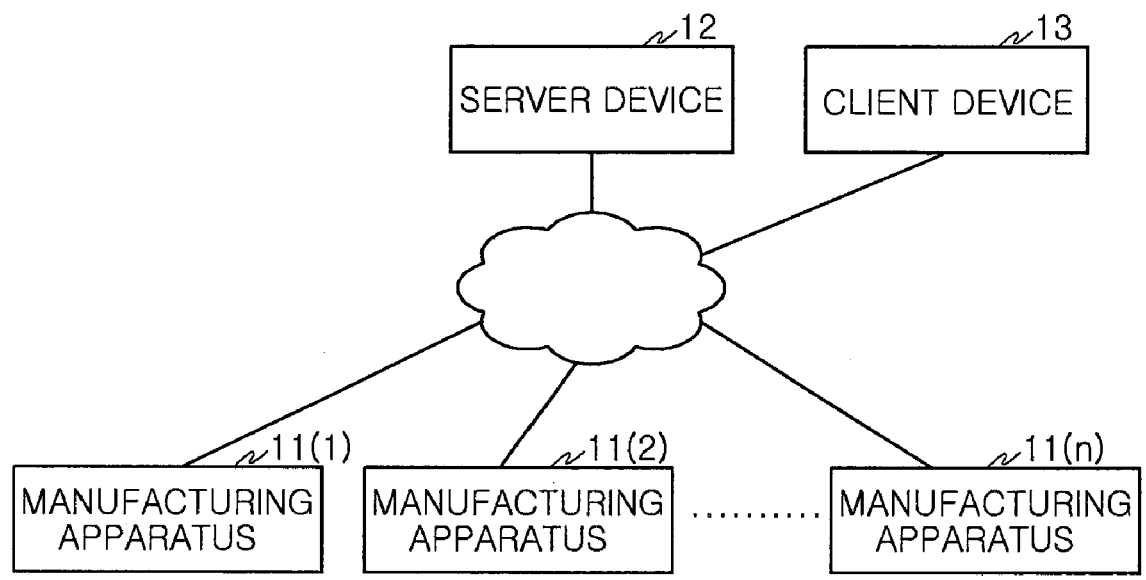
FIG. 1 is a conceptual diagram of a group management system in accordance with an embodiment of the present invention.
Figure 2:
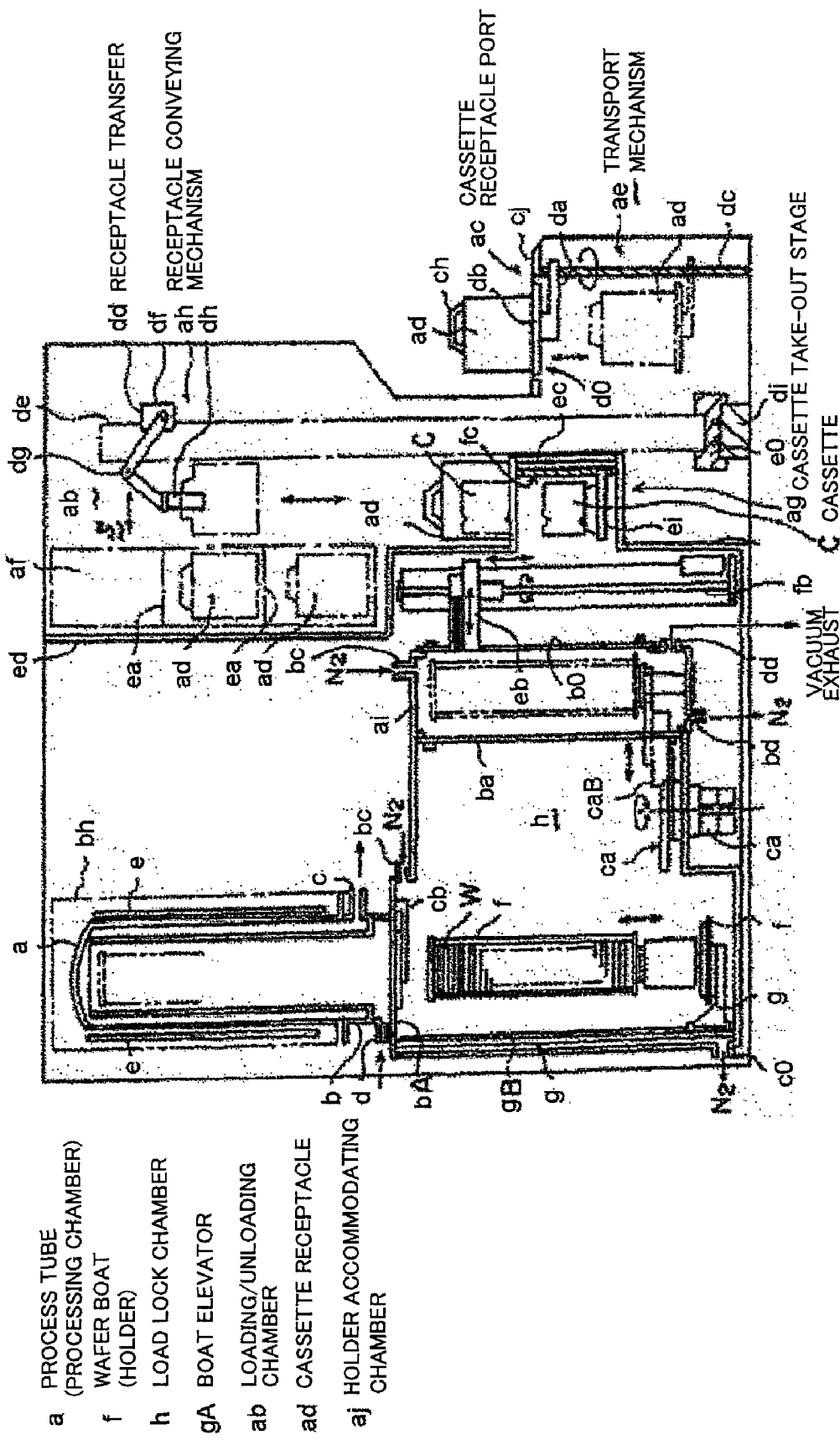
FIG. 2 illustrates an example of a semiconductor wafer manufacturing apparatus in accordance with the embodiment of the present invention.
Figure 3:
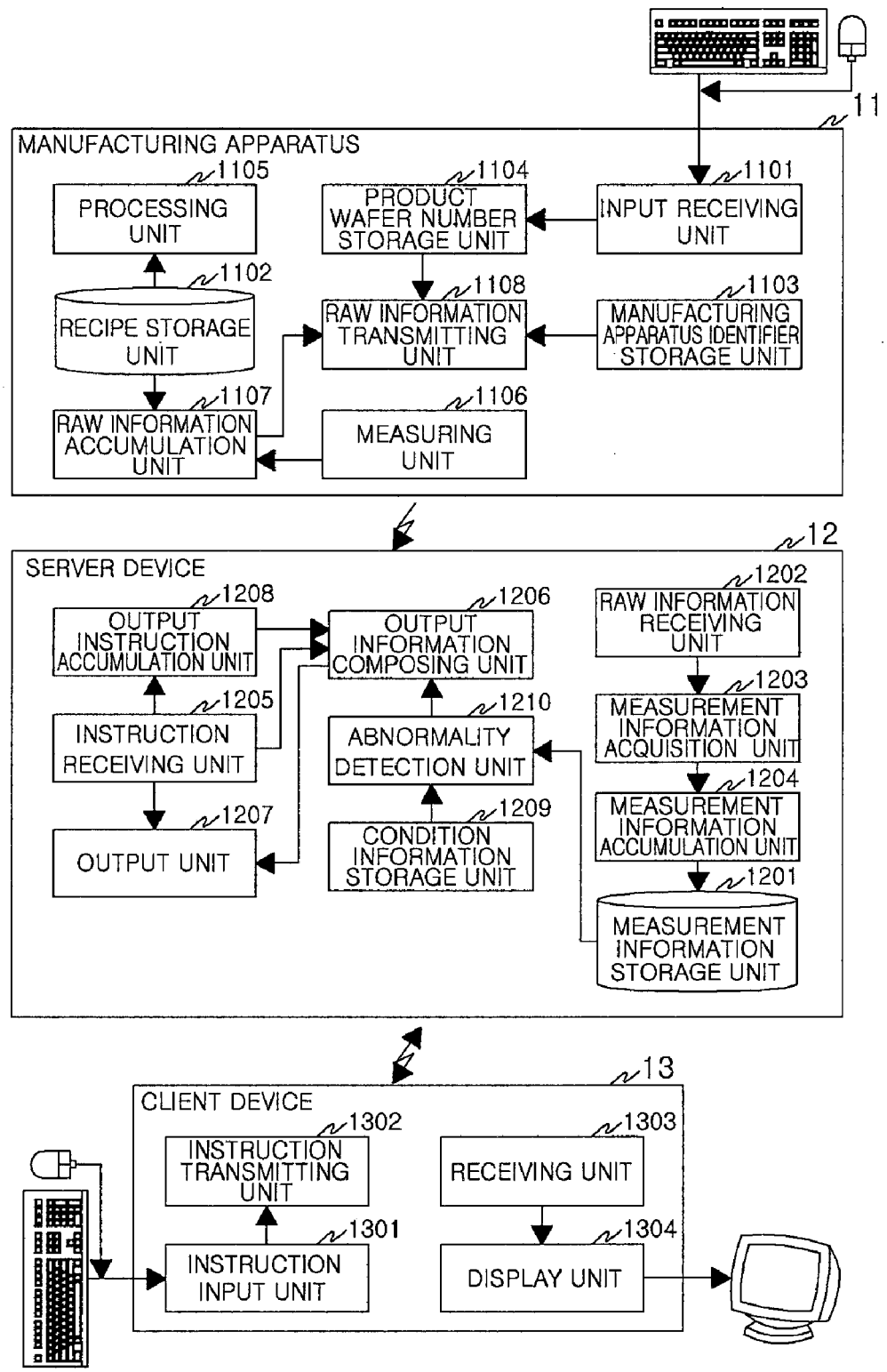
FIG. 3 sets forth a block diagram of the group management system in accordance with the embodiment of the present invention.
Figure 4:
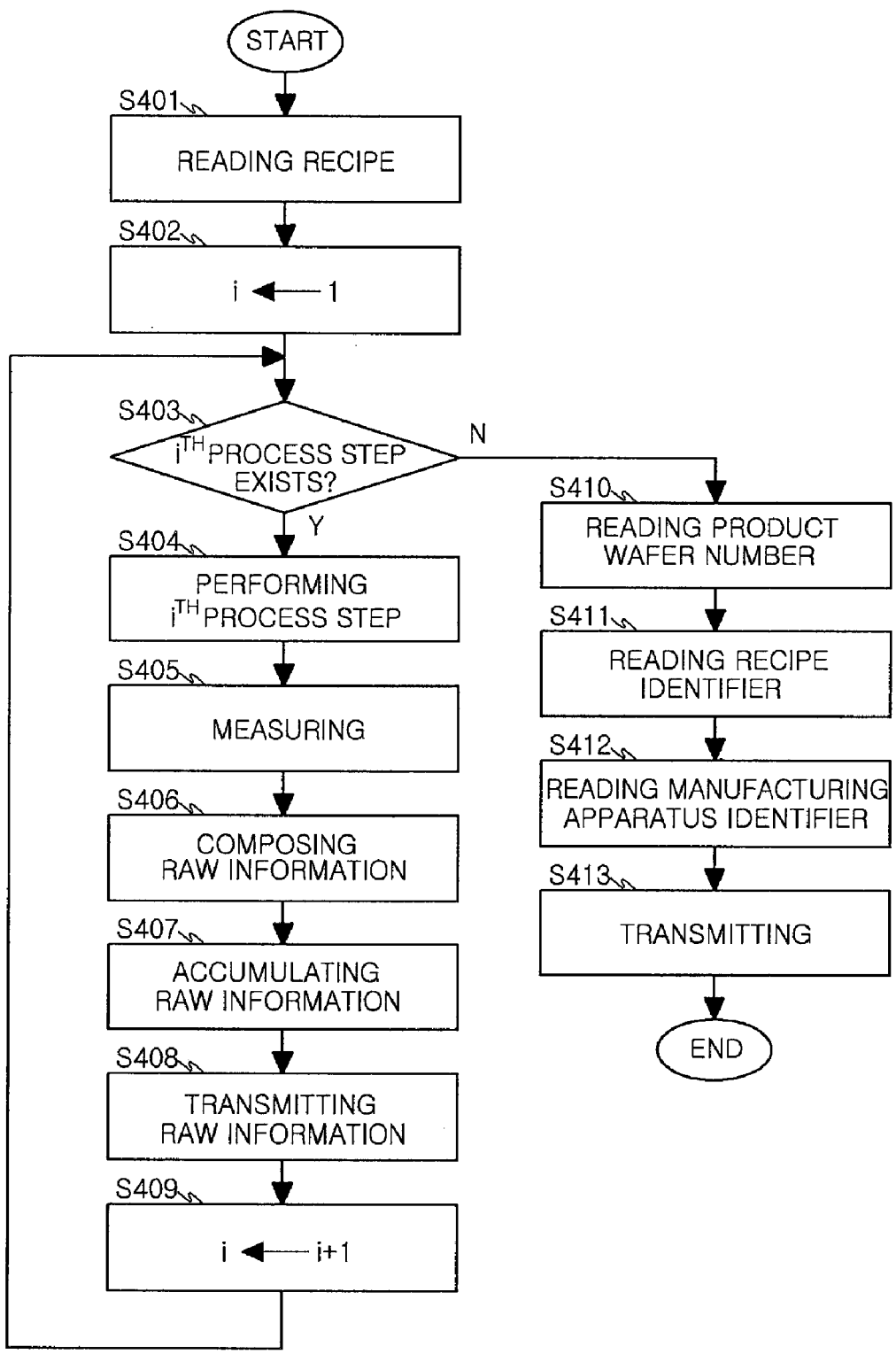
FIG. 4 depicts a flowchart to describe an operation of the manufacturing apparatus in accordance with the embodiment of the present invention.
Figure 5:
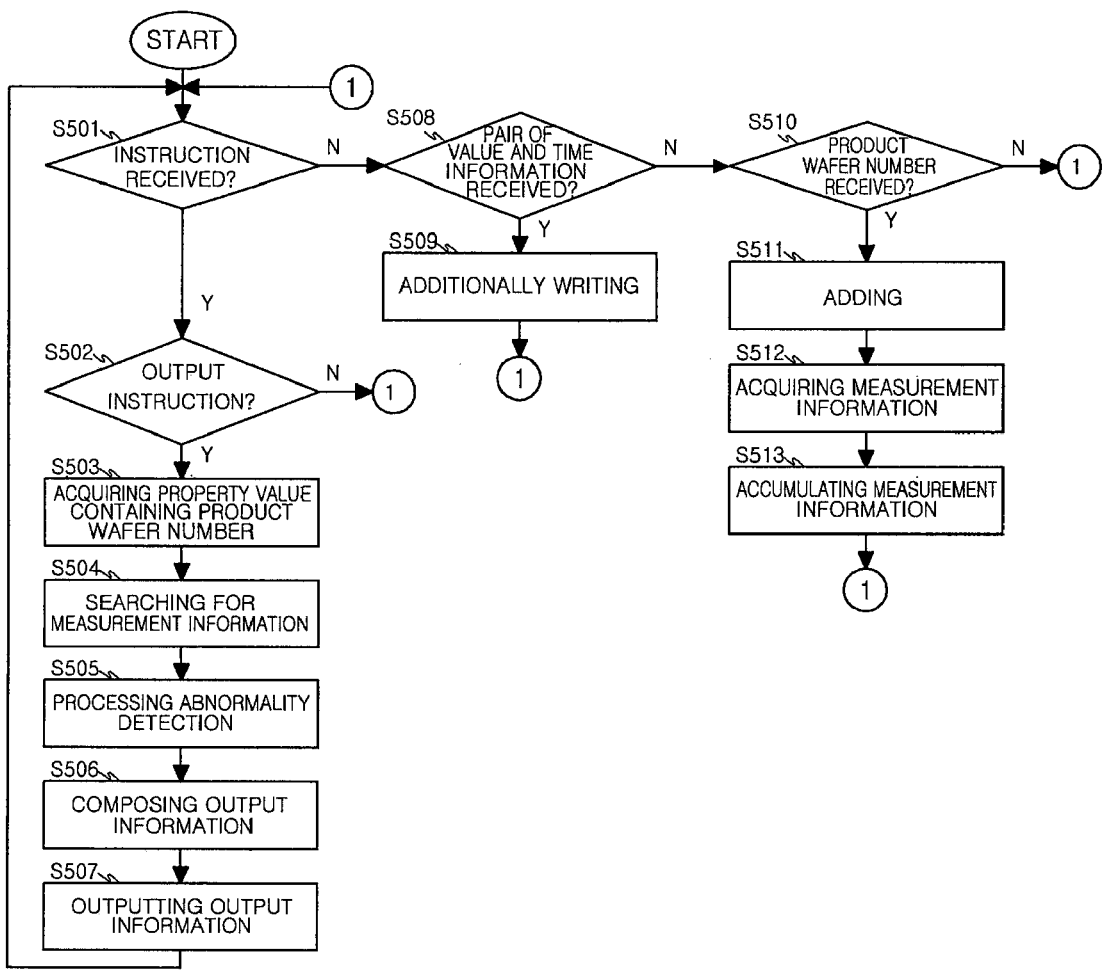
FIG. 5 presents a flowchart to describe an operation of a server device in accordance with the embodiment of the present invention.
Figure 6:
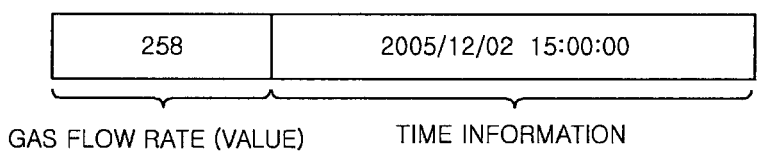
FIG. 6 illustrates an example of raw information in accordance with the embodiment of the present invention.
Figures 9, 10:
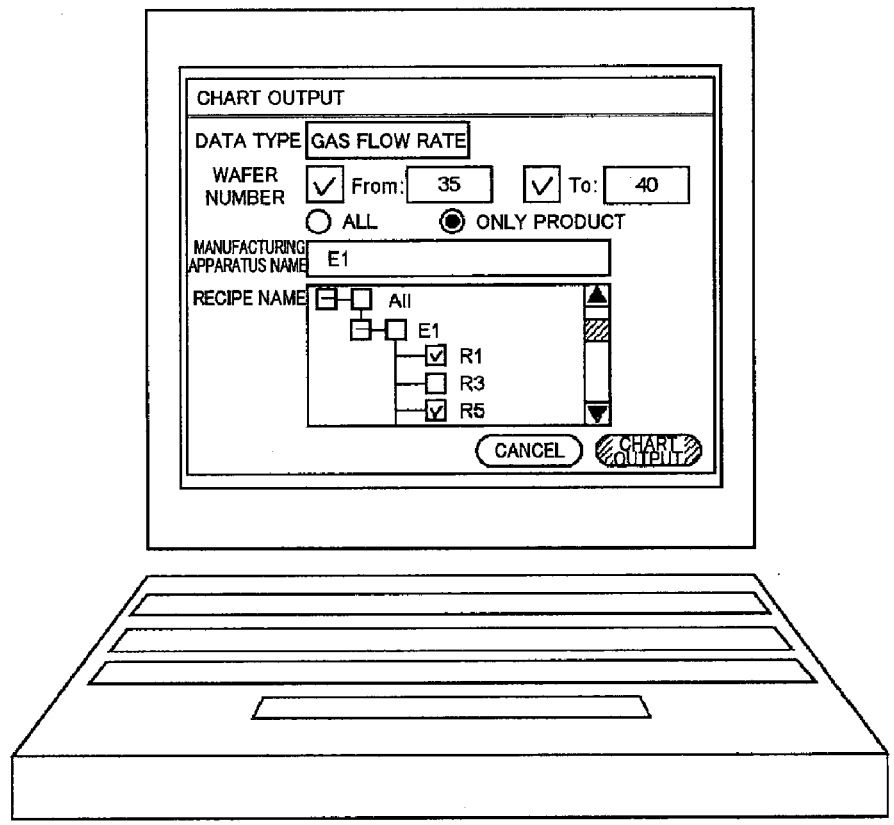
FIG. 9 offers an example of an input screen of an output instruction of a client device in accordance with the embodiment of the present invention.
FIG. 10 illustrates an example of information measured by a fault detection unit to be used as a basis of a chart.
Figure 11:
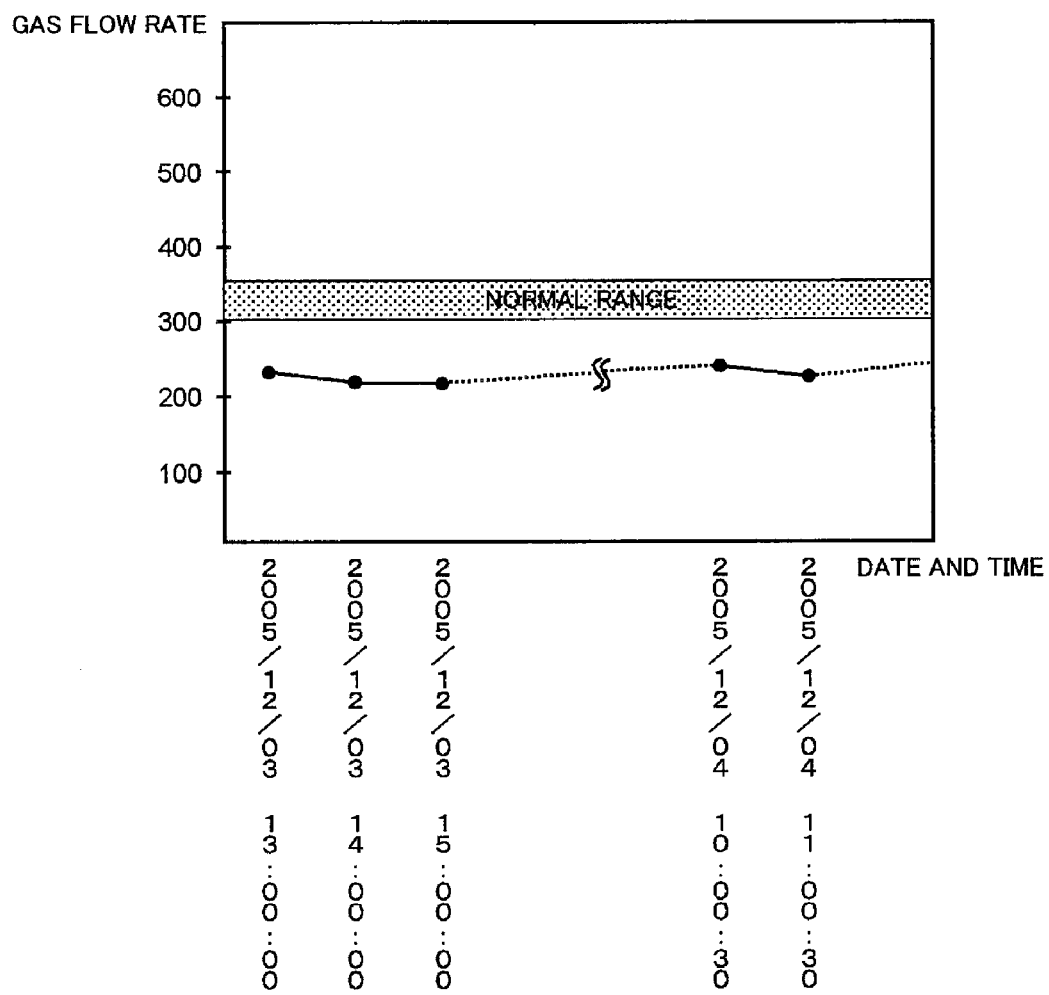
FIG. 11 illustrates an output example of a chart in the client device in accordance with the embodiment of the present invention.
Figure 12:
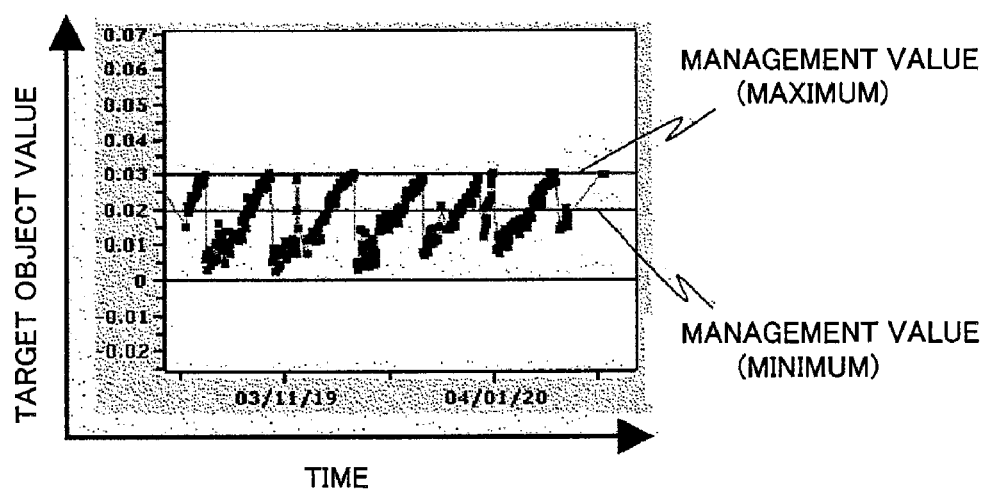
FIG. 12 illustrates an output example of a chart in the client device in accordance with the embodiment of the present invention.
Figure 13:
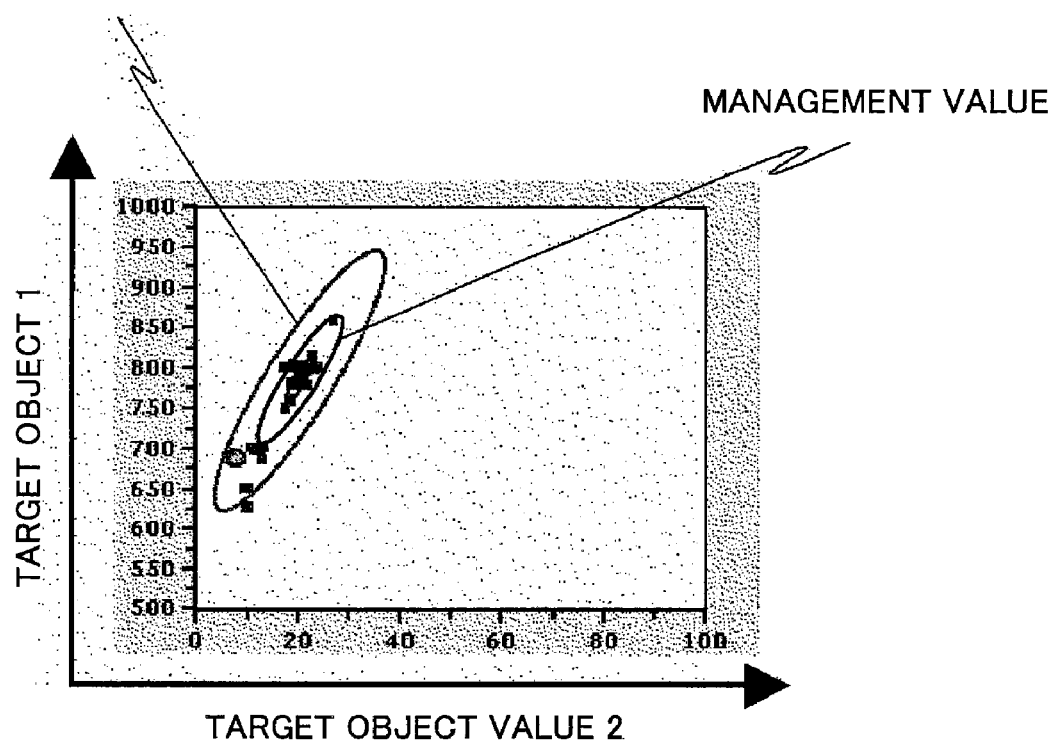
FIG. 13 illustrates an output example of a chart in the client device in accordance with the embodiment of the present invention.
Figure 14:
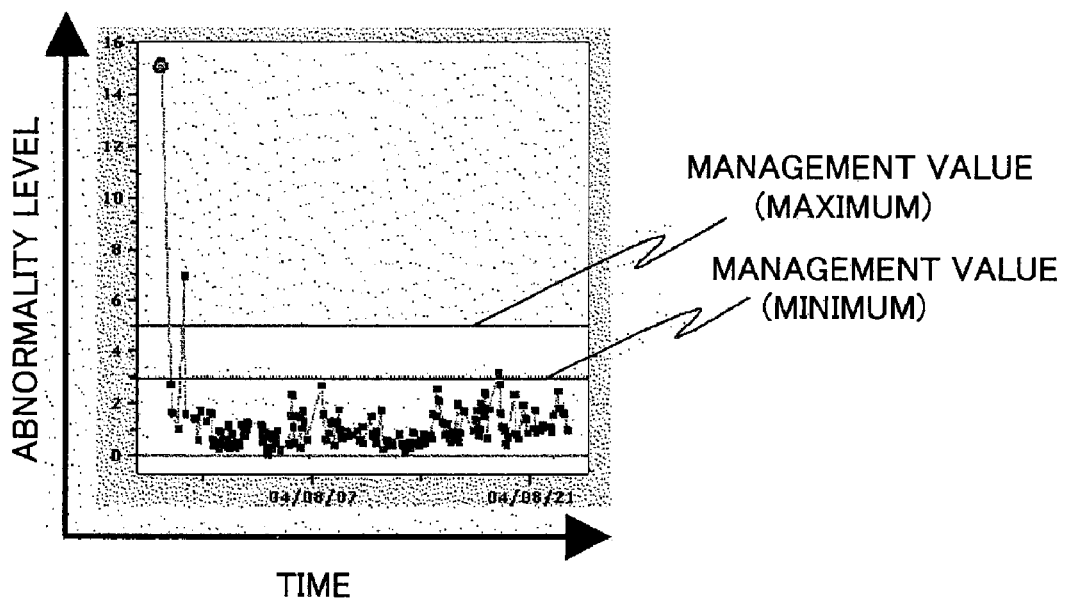
FIG. 14 illustrates an output example of a chart in the client device in accordance with the embodiment of the present invention.
Figure 15:
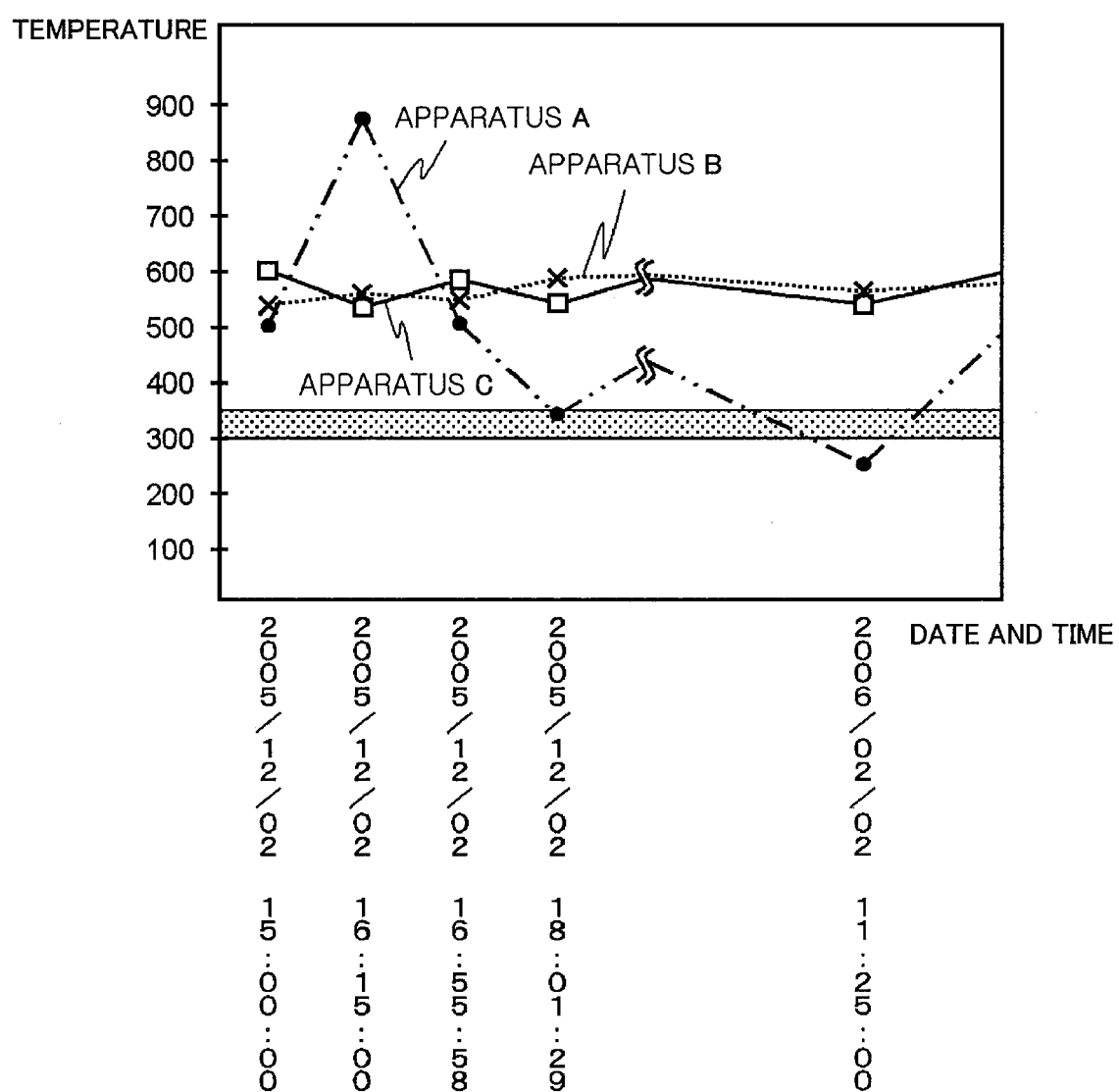
FIG. 15 illustrates an output example of a chart in the client device in accordance with the embodiment of the present invention.

What is claimed is:

1. A server device constituting a group management system, which includes a plurality of manufacturing apparatuses for performing a preset process on a target substrate and the server device connected with the plurality of manufacturing apparatuses and has a function of performing a fault detection, the server device comprising:
 a measurement information storage unit for storing therein plural measurement information, which is time sequential information measured in the plurality of manufacturing apparatuses and has a product wafer number, which is the number of wafers minus the number of dummy wafers, and is the number of product wafers to be manufactured in the manufacturing apparatuses, and time information indicating time;
 an instruction receiving unit for receiving an output instruction for output information, which contains a product wafer number condition related to the product wafer number;
 a condition information storage unit for storing therein condition information indicating conditions for determining whether the measurement information has a fault;
 a fault detection unit for, when the instruction receiving unit receives the output instruction, reading a multiplicity of measurement information satisfying the product wafer number condition contained in the output instruction from the measurement information storage unit, and determining whether the read multiplicity of measurement information satisfies the condition information;
 an output information composing unit for composing the output information according to a determination result of the fault detection unit; and
 an output unit for outputting the output information composed by the output information composing unit,
 wherein the dummy wafer is a non-product wafer that has not been processed by the manufacturing apparatus.

2. The server device of claim 1, wherein the measurement information is time sequential information measured in the plurality of manufacturing apparatuses, and has apparatus identifiers for identifying the manufacturing apparatuses, the product wafer number and the time information,
 the output instruction for the output information includes the product wafer number condition and one or more apparatus identifiers, and
 the fault detection unit reads, from the measurement information storage unit when the instruction receiving unit receives the output instruction, a number of measurement information satisfying the product wafer number condition contained in the output instruction and having any one of the one or more apparatus identifiers contained in the output instruction, and determines whether the read measurement information satisfies the condition information.

3. The server device of claim 1, wherein the measurement information is time sequential information measured in the plurality of manufacturing apparatuses, and has recipe identifiers for identifying recipes, the product wafer number and the time information,
 the output instruction for the output information includes the product wafer number condition and one or more recipe identifiers, and
 the fault detection unit reads, from the measurement information storage unit when the instruction receiving unit receives the output instruction, a number of measurement information satisfying the product wafer number condition contained in the output instruction and having any one of the one or more recipe identifiers contained in the output instruction, and determines whether the read measurement information satisfies the condition information.

4. The server device of claim 1, further comprising:
 a raw information receiving unit for receiving raw information serving as a basis of the plural measurement information from the plurality of manufacturing apparatuses;
 a measurement information acquisition unit for acquiring the plural measurement information by performing a preset calculation on a number of raw information received by the raw information receiving unit; and
 a measurement information accumulation unit for accumulating the plural measurement information acquired by the measurement information acquisition unit in the measurement information storage unit.

5. The server device of claim 4, wherein by being triggered upon receiving the output instruction by the instruction receiving unit,
 the fault detection unit determines whether the measurement information kept being acquired by the measurement information acquisition unit satisfies the condition information,
 the output information composing unit keeps on composing the output information according to the determination result of the fault detection unit, and
 the output unit outputs the output information composed by the output information composing unit, while updating the output information.

6. The server device of claim 1, wherein the output information composing unit composes, from the measurement information read from the measurement information storage unit by the fault detection unit, a statistical process control (SPC) chart visually distinguishing the measurement information of the different apparatus identifiers and plotting the read measurement information according to a time sequence indicated by the time information of one kind of measurement information, and
 the output unit outputs the statistical process control (SPC) chart composed by the output information composing unit.

7. The server device of claim 1, wherein the output information composing unit composes, from the measurement information read from the measurement information storage unit by the fault detection unit, a correlation chart visually distinguishing the measurement information of the different apparatus identifiers and showing a correlation between two kinds of measurement information, and
 the output unit outputs the correlation chart composed by the output information composing unit.

8. The server device of claim 1, wherein the output information composing unit composes, from the measurement information read from the measurement information storage unit by the fault detection unit, a mahalanobis distance (MD) chart visually distinguishing the measurement information of the different apparatus identifiers and showing a correlation between three or more kinds of measurement information, and the output unit outputs the mahalanobis distance (MD) chart composed by the output information composing unit.

9. The server device of claim 1, wherein the output information composing unit composes, from the measurement information read from the measurement information storage unit by the fault detection unit, a statistical process control (SPC) chart visually distinguishing the measurement information of the different recipe identifiers and plotting the read measurement information according to a time sequence indicated by the time information of one kind of measurement information, and the output unit outputs the statistical process control (SPC) chart composed by the output information composing unit.

10. The server device of claim 1, wherein the output information composing unit composes, from the measurement information read from the measurement information storage unit by the fault detection unit, a correlation chart visually distinguishing the measurement information of the different recipe identifiers and showing a correlation between two kinds of measurement information, and the output unit outputs the correlation chart composed by the output information composing unit.

11. The server device of claim 1, wherein the output information composing unit composes, from the measurement information read from the measurement information storage unit by the fault detection unit, a mahalanobis distance (MD) chart visually distinguishing the measurement information of the different recipe identifiers and showing a correlation between three of more kinds of measurement information, and the output unit outputs the mahalanobis distance (MD) chart composed by the output information composing unit.

12. A program for storing plural measurement information, which is time sequential information measured in a plurality of manufacturing apparatuses for performing a preset process on a target substrate and has a product wafer number, which is the number of wafers minus the number of dummy wafers, and is the number of product wafers to be manufactured in the manufacturing apparatuses, and time information indicating time, wherein the program executes on a computer:

an instruction receiving step for receiving an output instruction for output information, which includes a product wafer number condition related to the product wafer number;

a fault detecting step for, when the output instruction is received in the instruction receiving step, reading a multiplicity of measurement information satisfying the product wafer number condition contained in the output instruction, and determining whether the read multiplicity of measurement information satisfies stored condition information;

an output information composing step for composing the output information according to a determination result in the fault detecting step; and an outputting step for outputting the output information composed in the output information composing step, wherein the dummy wafer is a non-product wafer that has not been processed by the manufacturing apparatus.

13. The program of claim 12, wherein the measurement information is time sequential information measured in the plurality of manufacturing apparatuses and has apparatus identifiers for identifying the manufacturing apparatuses, the product wafer number and the time information, the output instruction for the output information includes the product wafer number condition and one or more apparatus identifiers, and in the fault detecting step, when the output instruction is received in the instruction receiving step, read is a number of measurement information satisfying the product wafer number condition contained in the output instruction and having any one of the one or more apparatus identifiers contained in the output instruction, and determined is whether the read measurement information satisfies the condition information.

14. The program of claim 12, wherein the measurement information is time sequential information measured in the plurality of manufacturing apparatuses and has recipe identifiers for identifying recipes, the product wafer number and the time information, the output instruction for the output information includes the product wafer number condition and one or more recipe identifiers, and in the fault detecting step, when the output instruction is received in the instruction receiving step, read is a number of measurement information satisfying the product wafer number condition contained in the output instruction and having any one of the one or more recipe identifiers contained in the output instruction, and determined is whether the read measurement information satisfies the condition information.

15. The program of claim 12, wherein the program further executes on the computer:

a raw information receiving step for receiving raw information serving as a basis of the plural measurement information, from the plurality of manufacturing apparatuses;

a measurement information acquiring step for acquiring the plural measurement information by performing a preset calculation on a number of raw information received in the raw information receiving step; and a measurement information accumulating step for accumulating the plural measurement information acquired in the measurement information acquiring step.

16. The program of claim 15, wherein by being triggered upon receiving the output instruction by the instruction receiving unit, in the fault detecting step, determined is whether the measurement information kept being acquired in the measurement information acquiring step satisfies the condition information, in the output information composing step, the output information is kept being composed according to the determination result in the fault detecting step, and in the outputting step, the output information composed in the output information composing step is outputted, while the output information is updated.

* * * * *

UNITED STATES PATENT AND TRADEMARK OFFICE
CERTIFICATE OF CORRECTION

PATENT NO. : 8,355,808 B2
APPLICATION NO. : 12/300015
DATED : January 15, 2013
INVENTOR(S) : Takumi Inokawa et al.

It is certified that error appears in the above-identified patent and that said Letters Patent is hereby corrected as shown below:

In the Specification, column 16, line 46, please remove "□" after the word "instruction".

In the Specification, column 16, line 49, please remove "□" after "R2".

In the Specification, column 16, line 51, please remove "□" after the word "instruction".

In the Specification, column 16, line 54, please remove "□" after "R2".

In the Specification, column 16, line 57, please remove "□" after the word "instruction".

In the Specification, column 16, line 60, please remove "□" after "R2".

In the Specification, column 16, line 63, please remove "□" after the word "satisfying".

In the Specification, column 16, line 65, please remove "□" after "R2".

Signed and Sealed this
Fourteenth Day of May, 2013

Teresa Stanek Rea
*Acting Director of the United States Patent and Trademark Office*